Jan. 30, 1962 R. S. ZELLER 3,019,329
WELDING APPARATUS
Filed July 15, 1955 12 Sheets-Sheet 1

INVENTOR.
Richard S. Zeller
BY John L. Houghton
HIS ATTORNEY.

Jan. 30, 1962 R. S. ZELLER 3,019,329
WELDING APPARATUS
Filed July 15, 1955 12 Sheets-Sheet 6

INVENTOR.
Richard S. Zeller
BY John L. Houghton
HIS ATTORNEY

Jan. 30, 1962   R. S. ZELLER   3,019,329
WELDING APPARATUS

Filed July 15, 1955   12 Sheets-Sheet 10

INVENTOR.
Richard S. Zeller.
BY John L. Stoughton
HIS ATTORNEY.

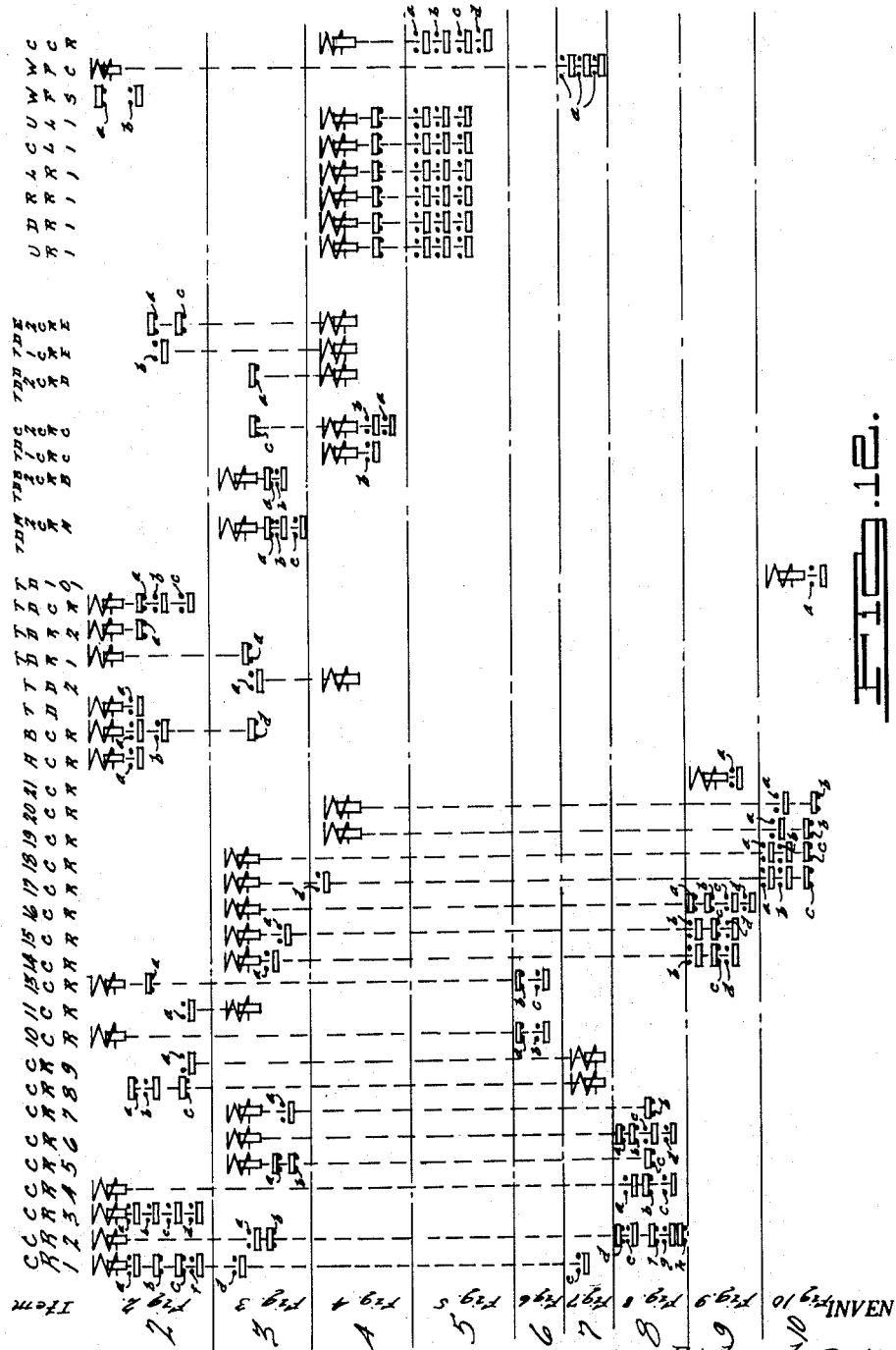

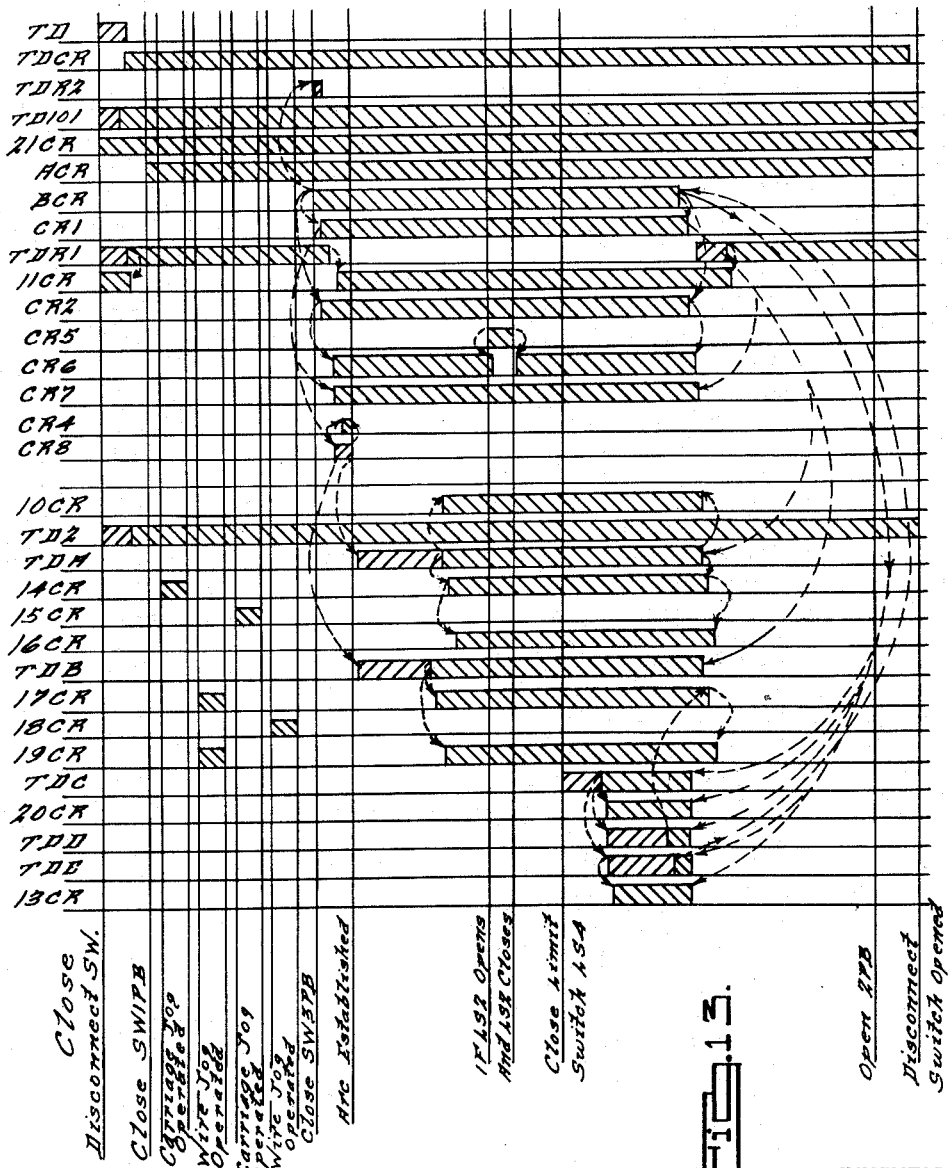

United States Patent Office 3,019,329
Patented Jan. 30, 1962

3,019,329
WELDING APPARATUS
Richard S. Zeller, Detroit, Mich., assignor to Weltronic Company, Detroit, Mich., a corporation of Michigan
Filed July 15, 1955, Ser. No. 522,264
4 Claims. (Cl. 219—131)

This invention relates to welding and more particularly to automatic arc welding apparatus.

In general, in the disclosed preferred embodiment of the invention, welding is performed by the establishing of a high-current arc between an electrode and the work in an inert-gas shielding atmosphere. Means are provided for moving the welding electrode along the work at a controlled rate, for varying the distance between the electrode and the work to establish the arc and to maintain the voltage between the arc and the work at a substantially constant preselected value, and for feeding fusible wire to the work area at a controlled and preselected rate. A switching arrangement functions to initiate these movements, to vary, automatically, the rate of movement of the electrode along the work and the rate of feed of the fusible wire in accordance with a selected pattern, and to terminate the system's elemental operations at preselected appropriate times.

In spite of the maintenance of a substantially constant arc voltage, however, variations in the composition, roughness or cleanliness of the work surface along the length of the weld will produce variations in the arc current and hence in the heat, producing corresponding variations in the quality of the weld. Further, the provision for selection of the arc voltage and of the rate of motion of the electrode along the work does not constitute an adequate, adjustable control of the weld heat to adapt the welder to a sufficient range of welding requirements.

The control of weld heat can best be accomplished through adjustment and control of the arc current. Consequently, means are provided in the disclosed preferred embodiment of the invention for varying the welding current in an adjustable manner as a function of time and as a function of the condition of other elements of the system. Thus, the initial welding current, and hence the initial heat, the running weld current and heat, and the final weld current and heat may be individually preselected, and the instant at which each transition starts and the rate of change of welding current during each transition may also be selected for each welding operation. The current controlling apparatus is then effective to maintain, with precision, the welding current at the preselected amplitudes despite variations in the work surface, or other variables. The particular control means disclosed also results in the ripple frequency of the rectified current being much higher than in the prior practice, and in the ripple peaks being of uniform amplitude. The resulting constant-amplitude, high-ripple-frequency, arc current produces a weld of highly uniform quality.

In the arc welding of two work edges together (as, for example, the adjacent edges of two plate members or the adjacent edges of a single metal piece formed with two adjacent edges) it is desirable to start at one end of the juxtaposed edges and then to gradually provide relative movement between the arc and work from the said one end along the juxtaposed edges and terminate at the other end of the edges. It has previously been recognized to be desirable to initiate the arc welding at a lesser current flow when the arc is closely adjacent the beginning end of the edges and, as the arc moves away from the said one end, to rapidly up-slope or increase the arc current from the initial value to a full value. Thereafter as the arc nears the opposite end of the edges, it is desirable to rapidly down-slope or decrease the arc current. In prior devices, however, the circuit inductances have been such that the minimum up-slope time interval has been about .250 seconds and the minimum down-slope time has been about .500 seconds. With the more rapid slope times provided by the practice of the principles of the present invention it is possible to satisfactorily weld at greater welding speeds, to weld thinner materials, to weld with greater precision, and, in instances where old apparatus could weld by the use of welding tabs, to eliminate the necessity for such tabs and their inherent disadvantages.

An object of this invention is to maintain an arc-welding current at a constant preselected value.

Another object of this invention is to improve the preciseness with which a welding current may be caused to vary in amplitude with time.

Another object of this invention is to reduce the time between the occurrence of an uncontrollable variation in the nature of the load and the establishing of a corrected, compensating value of welding current.

Another object of this invention is to increase the ripple frequency of a rectified alternating current and to maintain the ripple peaks at a uniform amplitude.

A feature of this invention is an improved means for moving a welding electrode in either of two directions along the work under automatic control.

Another feature of the invention is an improved means for reading at substantially full scale on a single voltmeter both a high-amplitude pre-arc voltage between a welding electrode and a workpiece, and the lower arc voltage.

A further feature of this invention is a means for disabling an automatic arc welder to function unless an inert gas is actually supplied to the work area.

Another feature of the invention is an improved means for controlling the instant at which an arc current will commence to change from one value to another value.

Another feature of this invention is an improved means for controllably varying the rate at which fusible wire is fed to the welding area.

Another feature of the invention is an improved current controlling mechanism which can change the current magnitude from a first preselected value to a second preselected value in a time interval of five hundredths of a second or less.

Another feature is an improved current controlling mechanism which will steplessly vary the current over an extremely large range, such as from a low limit which is insufficient to melt the metal being worked on to the maximum rated output of the machine being controlled.

The manner of accomplishment of the foregoing objects, the detailed nature of the foregoing features, and other objects and features of the invention, will be perceived from the following detailed description of an embodiment of the invention when read with reference to the accompanying drawings in which:

FIG. 12 is an indexing reference sheet identifying the figures upon which each relay winding and its several contacts may be found; and FIG. 13 is a chart showing the operating sequence of various of the relays and switches of the electrical apparatus.

Figure 1:
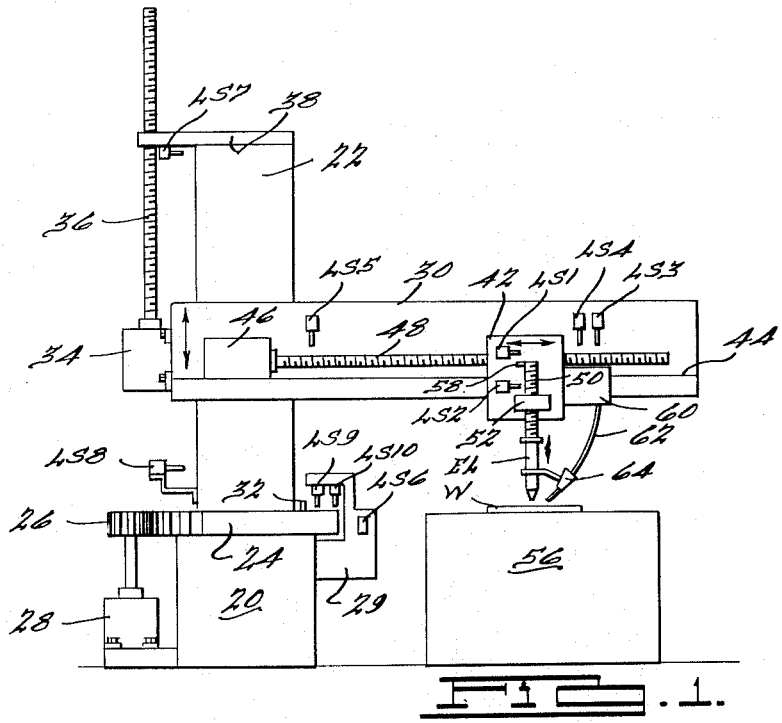
FIGURE 1 is a somewhat functionalized front elevational view of a welding machine to the operation of which the principles of the invention may be applied.

A machine embodying certain of the mechanical and electrical aspects of the invention is represented in a generally functional form in FIG. 1 of the drawings. Certain of the mechanical elements are basically similar to corresponding portions of commercially available radial drills, and many of the mechanical refinements there employed may be utilized to advantage in the present structure.

In general, the structure comprises a base 20 rotatably supporting a vertical column 22. A ring gear 24, fixed to the column 22, is engageable by a pinion 26 capable of being driven by a reversible motor 28, normally through appropriate reduction gearing. An arm 30 is supported upon the column 22, an appropriate keying arrangement being provided so that the arm 30 may move in translation in a vertical sense upon and with respect to the column 22 but is locked against rotation relative to the column 22. Hence, rotation of the column 22, as a result of energization of motor 28, will produce consequent rotation of the arm 30 about the vertical, longitudinal axis of the column 22.

It is assumed that the permissible rotation of the column 22 and arm 30 is slightly less than 360°. As an element of the electrical apparatus hereinafter to be described, a pair of limit switches LS9 and LS10 may be fixed with respect to the base 20 and positioned to engage an element such as pin 32, mounted on the gear 24, for sensing when the column 22 and arm 30 have reached their preselected limits of rotation in each direction.

Clamping means 29 may be mounted upon the base 20 and engageable with some portion of the gear 24 or column 22 and effective, when energized, to firmly clamp the ring and column against rotation. A limit switch LS6 is preferably provided to sense the clamped or unclamped condition of the column 22 and arm 30.

The arm 30 may be moved up and down upon the column 22 by suitable means functionally represented as a motor 34, which may include reduction gearing, mounted upon the arm 30 and adapted to rotate a worm 36 threadedly engaging a nut fixed within a top cap 38 mounted upon the column 22. The elevating mechanism represented is, of course, but a rudimentary functional representation of the type of elevating mechanism which would be employed in practice.

As additional elements of the electrical apparatus hereinafter to be described, a limit switch LS7 may be mounted upon the top cap 38 in a position to be engaged by the arm 30 when it approaches its upper limit position, and a limit switch LS8 may be affixed to, for example, the column 22 in a position to engage the arm as it approaches its lower limit of motion.

A carriage 42 is slidably mounted upon ways 44 upon the arm 30 so as to be movable in translation along the length of arm 30 by means such as a motor 46 driving, preferably through reduction gearing, a worm 48. A limit switch LS5 may be appropriately and adjustably positioned upon the arm 30 to engage a portion of the carriage 42 when that carriage approaches its innermost, lefthand, or reverse position; a limit switch LS3 may be mounted upon the arm 30 in a position to engage a portion of the carriage 42 when that carriage approaches an adjustably selected, outermost, right-hand, or forward limit position; and a limit switch LS4 may be adjustably positioned at an appropriate point, normally intermediate limit switches LS3 and LS5. Limit switch LS4, as will be noted hereinafter, is provided to sense when the weld is about completed, and hence is representatively shown in a position adjacent limit switch LS3, it being assumed that the carriage 42 is moved from left to right during the actual welding operation.

The carriage 42 supports a vertically movable automatic head assembly. This assembly is represented, in a rudimentary form, as a worm 50 keyed so that it cannot rotate relative to the carriage 42 and driven by a nut rotated by a motor 52. Worm 50 carries a welding electrode EL. Hence, the selective rotation of motor 52 will move the electrode EL towards or away from the work W mounted upon a fixture 56.

A limit switch LS2 may be mounted upon the carriage 42 in a position to engage an element 58 upon the worm 50 to sense when the automatic head assembly has reached its selected lower limit of motion, and a limit switch LS1 may be positioned to sense when the head assembly has reached its selected upper limit of motion.

The electrode EL is preferably water-cooled by flowing water through a water jacket (not shown) surrounding a portion of that electrode. Means are preferably provided for sensing the existence of water flow to indicate that the cooling system is properly operating. This means may comprise a pressure-sensitive, bellows operated microswitch (labeled WFS in the circuits of FIG. 2) for detecting pressure differentials at the water jacket, and hence water flow. The valve controlling the flow of water is also preferably solenoid operated as will be noted hereinafter.

It is also preferred that the welding operation be performed in an inert atmosphere to prevent oxidation of the electrodes and inclusion of atmospheric gases in the weld metal, especially nitrogen, and consequently a supply of an appropriate gas, such as helium or argon, may be connected to a nozzle positioned adjacent or coaxially with the welding electrode EL for directing that gas to the work area. The valves controlling the flow of gas are preferably solenoid operated, as will be noted, and means in the form of a gas-pressure switch (labeled PS1 in the circuits of FIG. 3) is preferably provided for sensing the flow of gas at the nozzle.

It is also contemplated that a supply of fusible wire 62 is provided at the work area. This is functionally represented by a drum-and-driving-motor assembly 60 mounted upon the carriage 42 and feeding the wire 62 through a guide means 64 mounted upon but insulated from the electrode EL or its supporting structure. Driving motor 60 is or may be automatic in its operation as will be described hereinafter.

Considering now the electrical control system, certain of the elements represented in FIGS. 2 to 11 are physically mounted upon the machine represented in FIG. 1, others of the elements are preferably mounted in an auxiliary cabinet, and at least a portion of the control switches are preferably located on a control panel convenient to the welding electrode EL and hence convenient to the operator at the work area.

In the circuit diagrams of FIGS. 2 to 11, the windings of relays are represented by a circle, a pair of contacts operated by that relay which are open or separated when the relay is unenergized and closed when the relay is energized, normally open contacts, are represented by a pair of parallel spaced-apart straight lines, and a pair of contacts which are closed or in engagement when the relay is unenergized and open or separated when the relay is energized, normally closed contacts, are represented by a pair of spaced-apart parallel lines bridged by an oblique line. To facilitate understanding of the functional operation of the system, the contacts are shown separated from the relay windings and in their functional relationship to other elements of the system. However, each contact is identified with a reference character identical to that of the winding of the relay of which it is a part, followed by a further distinguishing letter. Transformer windings are represented in the normal fashion except that the primary and secondary windings of certain of the transformers are separated for clarity of presentation. However, they are similarly designated so that each secondary winding may be correlated with the appropriate primary winding. Resistors are represented by a rectangle, capacitors by spaced-apart straight and curved lines. This symbolism is conventional in the art to which this invention pertains. The remaining elements of the system are represented in a form common to most fields of the electrical art.

In the description of the circuits, when notation is made of the number of the figure in which an element is depicted, the elements subsequently discussed will be found in the same figure until attention is directed to a different figure of the drawings.

Figure 4:
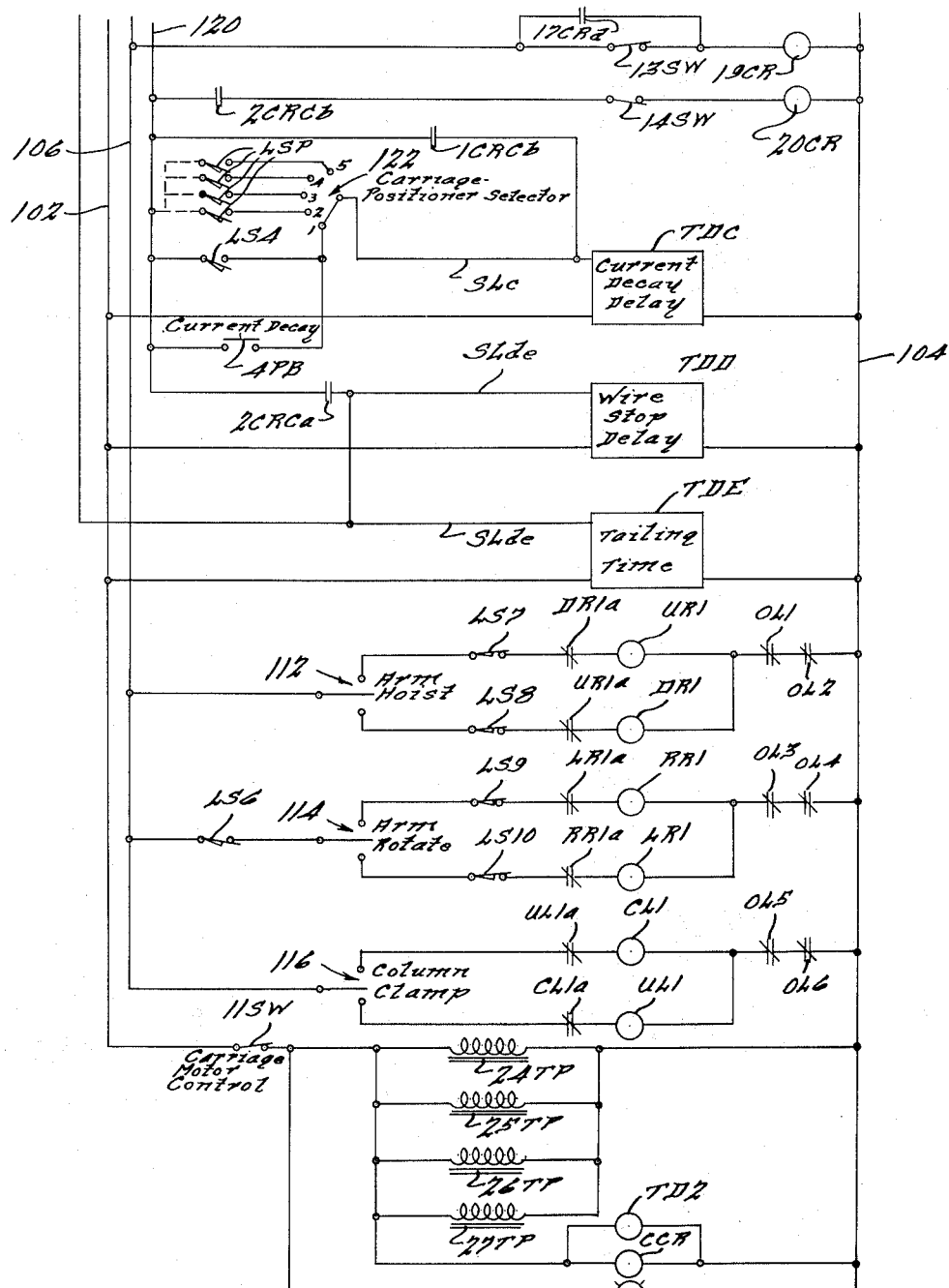
FIG. 4 is a schematic representation of another portion of the electrical control circuits, and should be placed below FIG. 3 for proper orientation.
Figure 5:
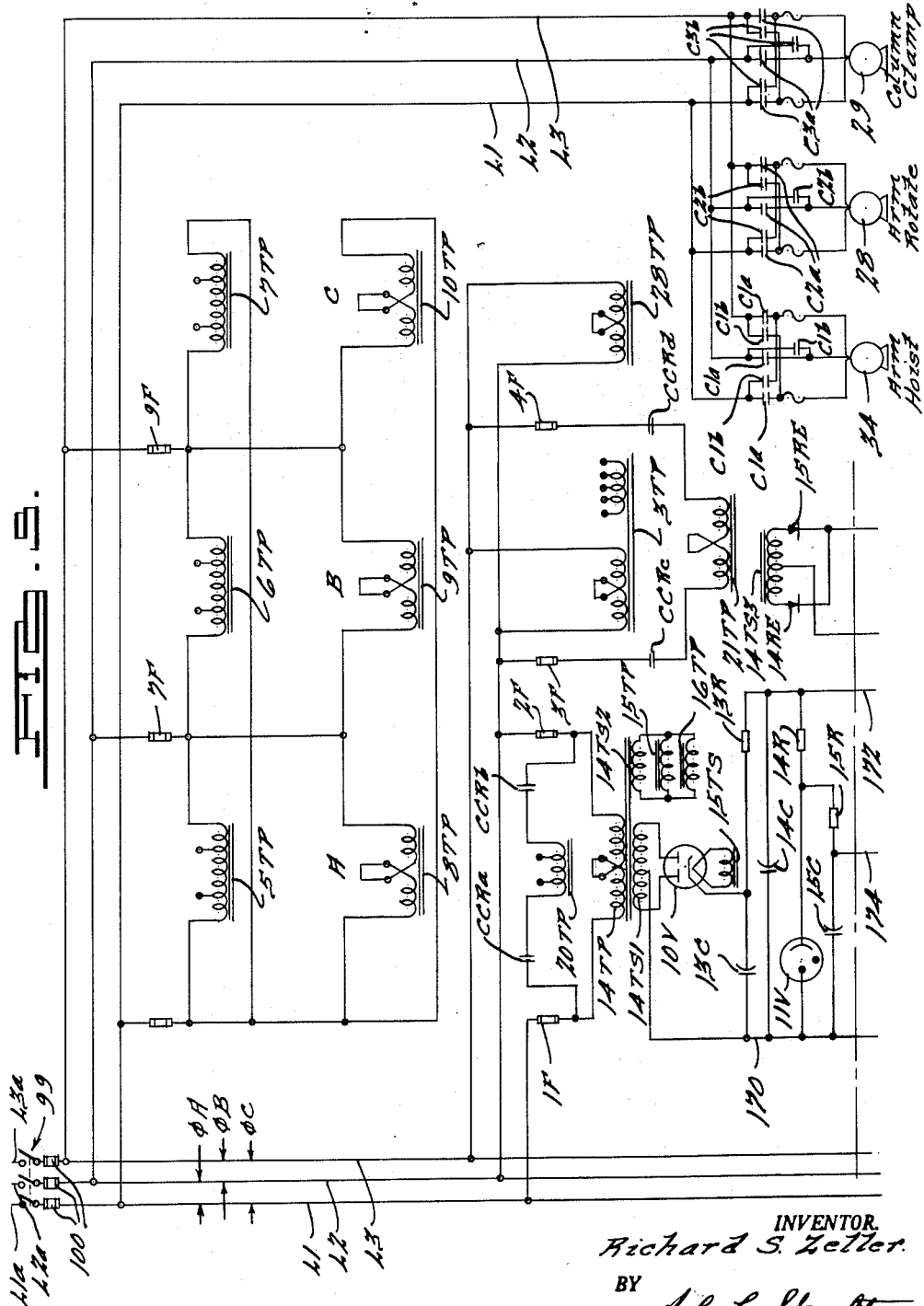
FIG. 5 is a schematic representation of certain of the power-supply transformer windings and a portion of an apparatus for controlling the amplitude of the welding current.

The system is intended to operate from a supply of three-phase alternating voltage of, for example, 440 volts amplitude, applied across lines L1a, L2a and L3a (FIG. 5). Upon the closure of line switch 99, one phase of this voltage, phase B appearing between conductors L2 and L3 (FIG. 5), is applied across the primary winding of transformer 3TP to develop across the associated secondary winding 3TS (FIG. 2) a single-phase alternating voltage of an appropriate amplitude, such as 115 volts. This secondary voltage is applied, through fuses 11F and 12F, between conductors 102 and 104 which extend from FIG. 2 to FIG. 4 of the drawings. Lamp 1PL (FIG. 2), is connected between conductors 102 and 104 to indicate that the power is on.

In order to establish a slight time delay between the closing of power through the line and the complete operation of the system, to permit filament heating and purging of the gas lines, time delay relay TD is operated over a path including normally and now closed contact TDCRa and conductors 102 and 104. After a selected interval, relay TD will close its contacts TDa to operate relay TDCR. Relay TDCR, in operating, completes a circuit for maintaining itself energized which may be traced from conductor 102, contact TDCRb, winding of relay TDCR and conductor 104. This circuit bypasses contact TDa which completed the energizing circuit for relay TDCR. This operation of a relay in which it completes a circuit through one of its own contacts to maintain a self-energizing circuit shunting the original energizing contact will hereinafter be referred to as "sealing in," in accordance with the nomenclature customary in the art.

Relay TDCR, in operating, also opens its contact TDCRa to release time delay relay TD, and completes a circuit from conductor 102, contacts TDCRc, lamp 2PL to conductor 104 to establish a visible indication that the time delay is over.

The closure of contact TDCRc places the further functioning of the equipment under the control of the master start switch 1PB. When switch 1PB is momentarily depressed, relay ACR is operated, and that relay seals over a circuit including its contact ACRa and the emergency stop switch 2PB. As will be seen, emergency stop switch 2PB will serve, when momentarily depressed, to terminate the motion and functioning of all elements of the machine. Lamp 3PL, energized concurrently with relay ACR and maintained energized over a circuit including contact ACRa, provides a visible indication that the master start switch 1PB has been operated.

Figure 2:
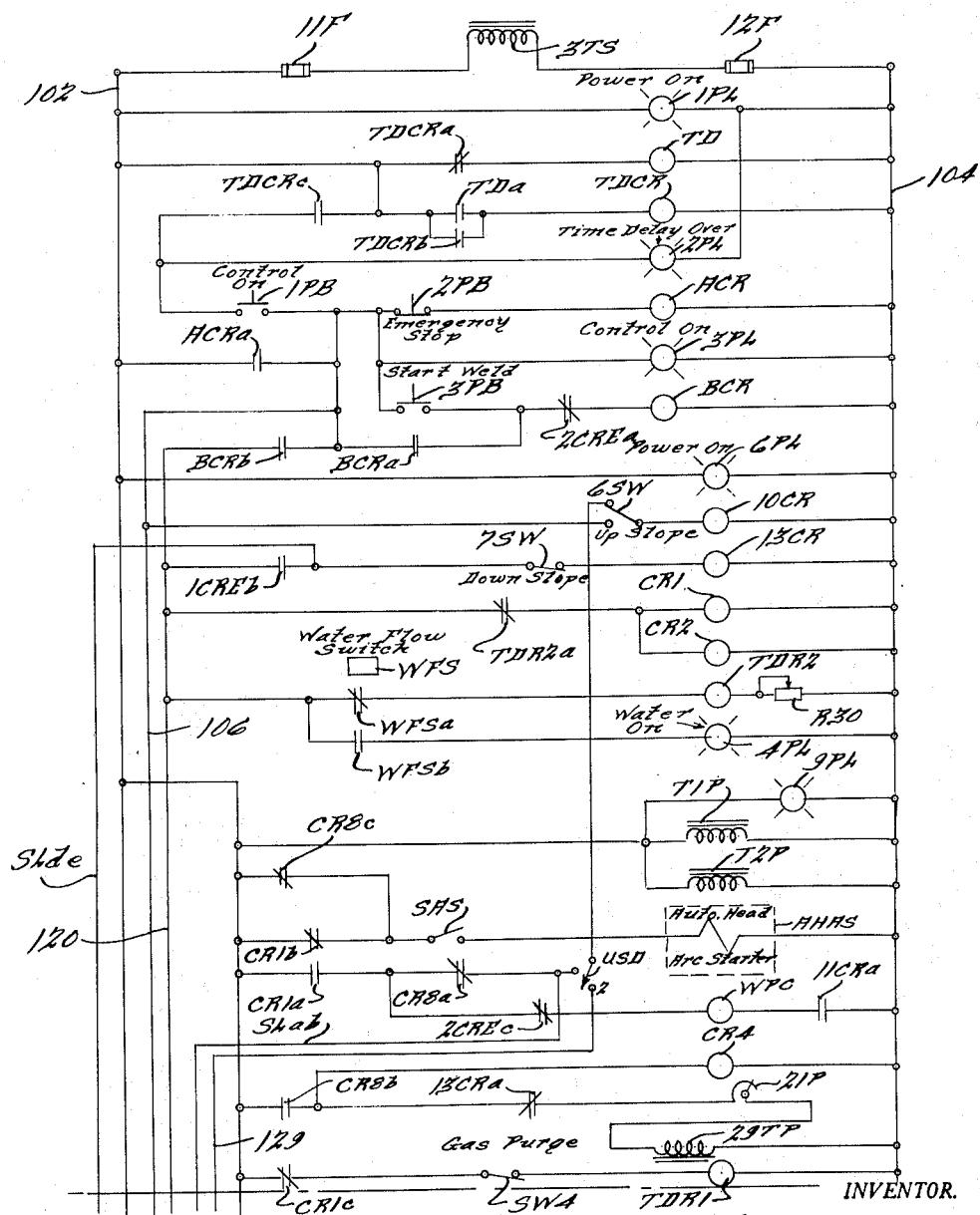
FIG. 2 is a schematic representation of a portion of the electrical circuits for controlling the time, sequence and nature of the operations of the apparatus of FIG. 1.
Figure 3:
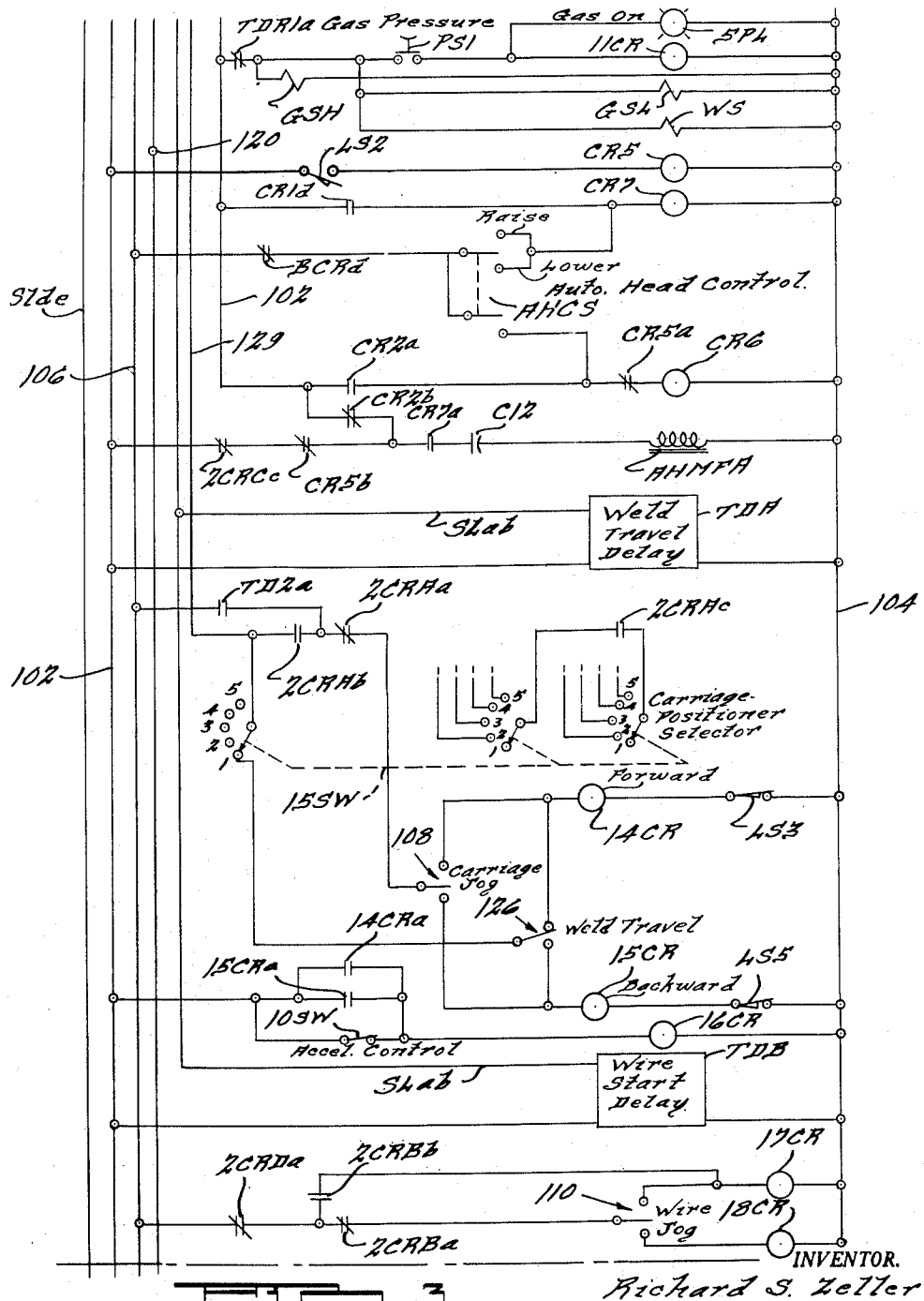
FIG. 3 is a schematic representation of another portion of the electrical control circuits, and should be placed below FIG. 2 for proper orientation.

The closure of contact ACRa also connects conductor 102 to conductor 106, which extends through FIGS. 2 to 4 of the drawings, to enable the operation of the equipment connected between conductor 106 and conductor 104. Thus, the carriage motor 46 (FIG. 1) may be manually controlled, via switch 108 (FIG. 3) in a manner to be described, to move the carriage 42 (FIG. 1) and the electrode EL along the arm 30 relative to the work W. Further, the wire 62 may be manually fed to or retracted from the work W via switch 110 (FIG. 3), and the electrode EL (FIG. 1) may be raised or lowered under manual control via switch AHCS (FIG. 3), both in a manner to be described.

Additionally, the application of voltage between conductors 106 and 104 permits the arm 30 (FIG. 1) to be moved up or down upon the column 22, permits the arm 30 to be rotated about the longitudinal axis of the column 22, and permits the clamping mechanism 29 to be selectively energized or de-energized. Thus, if the swinger of the arm hoist control switch 112 (FIG. 4) is moved into engagement with its upper contact, the voltage on conductor 106 is applied through limit switch LS7, through normally and now closed contact DR1a, winding of the up-control relay UR1 and through overload switches OL1 and OL2 (associated with motor 34 [FIG. 5]) to conductor 104 whereby relay UR1 is operated. Relay UR1, in operating, effects the closure of the contactor elements C1a (FIG. 5) to so apply the power on conductors L1, L2 and L3 that the arm hoist motor 34 is caused to rotate in a proper direction to produce upward movement of the arm 30 (FIG. 1). This motion may be continued until limit switch LS7 (FIGS. 1 and 4) is tripped.

If the swinger of switch 112 (FIG. 4) is moved into engagement with its lower contact, the arm-down relay DR1 will be energized to effect the closure of the contactor elements C1b (FIG. 5) to cause the arm hoist motor 34 to rotate in a reverse direction. Limit switch LS8 (FIGS. 1 and 4) establishes a lower limit to this downward motion. It will be noted that a normally closed contact UR1a of the up relay UR1 is included in the energizing circuit for the down relay DR1, and conversely, to protect against short circuiting of the power supply lines.

Assuming the clamping mechanism is unclamped so that limit switch LS6 (FIGS. 1 and 4) is closed, the wiper of switch 114 (FIG. 4) may be moved to its upper position to complete an energizing circuit for relay RR1 through normally closed limit switch LS9, through normally and now closed contact LR1a, and through overload switches OL3 and OL4, which are responsive to the condition of the arm rotate motor 28 (FIGS. 1 and 5). Relay RR1, in operating, effects the closure of the contactor elements C2a (FIG. 5) to energize the arm-rotate motor 28. Limit switch LS9 serves to terminate the rotation of the arm in one direction when a preselected limit position is reached. Similarly, if the swinger of switch 114 is placed in engagement with its lower contact, relay LR1 is energized to effect the closure of the contactor elements C2b to cause the motor 28 to rotate in the other direction, the limit of that motion being established by the position of limit switch LS10.

Assuming that the column clamp mechanism 29 (FIG. 1) is either motor-driven, or is an electric-motor powered hydraulic system, so that motor 29 (FIG. 5) controls the clamping operation, the column and arm may be clamped against movement by causing the column clamp motor 29 (FIG. 5) to rotate in one direction by moving the swinger of switch 116 (FIG. 4) to its upper position to operate relay CL1. Motor 29 (FIG. 5) is rotated in the other direction to control the release of clamping, unclamping, when the unclamp relay UL1 (FIG. 4) is energized by moving the swinger of switch 116 into engagement with its lower contact.

Thus, at this point in the system's operation, the welding electrode EL may be moved to any selected position relative to the work by the selective operation of a plurality of control switches.

Time delay circuits

Certain of the operations of the equipment hereinafter to be described are controlled by the time delay units, represented in block schematic form, TDA (FIG. 3), TDB, TDC (FIG. 4), TDD, and TDE. Each of these timers is connected between conductors 102 and 104, as their source of power, and additionally each of the timers is provided with a start lead for initiating its timing operation. Thus, timers TDA and TDB (FIG. 3) share a start lead SL*ab*, timer TDC is provided with a start lead SL*c* (FIG. 4) and timers TDD and TDE share a start lead SLD*e*. As will be noted, the control circuits function selectively to connect, at a selected time, these start leads to conductor 102 to initiate the individual timing operations.

Figure 11:
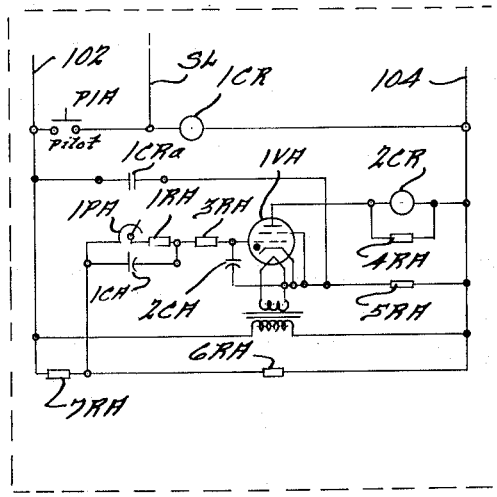
FIG. 11 is a schematic representation of a time delay mechanism suitable for use in the time delay represented in block schematic form in FIGS. 3 and 4 of the drawings.

While any appropriate time delay mechanism may be used, a suitable type of such mechanism is disclosed in FIG. 11 of the drawings in order that the disclosure may be complete. In that representation, the conductors labeled 102 and 104 are identical to conductors 102 and 104 in FIGS. 2 to 4. The other input to the timer is a start lead labeled SL which finds its counterpart in the several enumerated start leads in FIGS. 3 and 4.

When alternating voltage is applied between conductors 102 and 104, as previously described, resistors 7RA and 6RA serve as a voltage divider. The resultant alternating voltage across resistor 6RA is applied across a circuit including capacitor 1CA, which is connected in parallel with variable resistor 1PA and fixed resistor 1RA, and further including fixed resistor 3RA, the grid-to-cathode path of thyratron 1VA, and resistor 5RA. As a consequence, rectification will occur and capacitor 1CA will become charged, with its left-hand electrode being positive relative to its right-hand electrode. With the contacts 1CR*a* open the anode-cathode circuit of tube 1VA is open and it consequently will not conduct.

This condition continues until such time as either the pilot switch P1A is depressed for some reason, or, normally, until start lead SL is connected to conductor 102 in the manner hereinafter to be described. When that connection occurs, control relay 1CR is operated to close its contact 1CR*a* to connect the cathode of tube 1VA to conductor 102. The anode of tube 1VA is connected to conductor 104 through the winding of relay 2CR, which is shunted by resistor 4RA. The completion of the anode-cathode circuit of thyratron 1VA does not result in the immediate conduction of tube 1VA since closing of the contacts 1CR*a* also connects the positively charged terminal of the capacitor 1CA to the cathode of thyratron 1VA and the magnitude of the charge on this capacitor is sufficient to place a negative bias on the grid of thyratron 1VA. However, when contact 1CR*a* closes to connect the cathode of tube 1VA directly to conductor 102, no further rectification occurs and capacitor 1CA commences to discharge through resistor 1RA and variable resistor 1PA, the time constant of the circuit, and hence the time delay produced by the device, being selected by adjustment of the position of variable resistor 1PA and/ or adjustment of the value of capacitor 1CA. The resistor 7RA is connected in the grid bias circuit and provides a small A.-C. bias on the D.-C. bias for rendering the time delay more accurate and the firing of the thyratrons more positive. After the selected time delay, the direct-voltage bias will become reduced to the point where tube 1VA will conduct and operate relay 2CR. Thereafter, relay 2CR will be held operated as long as voltage is applied between conductors 102 and 104.

Relay 1CR is or may be provided with contacts additional to the contact 1CR*a* shown in FIG. 11 and relay 2CR is provided with operating contacts. To avoid confusion, those contacts of the relay 1CR in the delay unit TDA (FIG. 3) are labeled 1CRA followed by a lower-case distinguishing letter, those contacts of the relay 2CR which is a part of timer TDA are labeled 2CRA followed by a lower-case distinguishing letter, the contacts of the relay 1CR which is a part of timer TDB are labeled 1CRB followed by a lower-case distinguishing letter, and so on.

Preparation for welding

When power is first applied between conductors 102 and 104, current flows through the normally and now closed contact TDR1*a* (FIG. 3) and through, in parallel, gas solenoid GSH in the automatic head, gas solenoid GSL in the gas line, and water solenoid WS, thereby turning on both the supply of gas and water. Further, at the application of power between conductors 102 and 104, a voltage is applied across a circuit including the normally and now closed contacts CR1*c* (FIG. 2), the gas purge switch SW4 (assuming that switch to be closed), and the winding of timer TDR1. After a selected time interval, the time delay relay or timer TDR1 opens its normally closed contact TDR1*a* (FIG. 3) to de-energize the gas solenoids GSH and GSL and the water solenoid WS. This operation serves primarily to purge the lines of air.

Welding

The apparatus is now in condition for welding to proceed, assuming the parts to be welded are in position, that the arm 30 has been positioned, that the several controls have been appropriately manipulated to bring the welding electrode into its proper starting position, and that the column and arm have been clamped in position.

The welding operation may be performed on a fully automatic basis. When the operation of the apparatus is initiated, the flow of gas and water is started, the manual control over the motion of the elements is disabled, the welding electrode is automatically positioned, and varied in position if necessary, relative to the work to maintain a constant arc voltage, the movement of the carriage is initiated, controlled and varied in a preselected fashion, the welding current is maintained constant or varied in a preselected manner, the feeding of the fusible wire to the work is initiated and controlled, and each of the system's elemental operations is terminated at the appropriate time.

To commence welding, the start weld switch 3PB (FIG. 2) is momentarily operated to complete a circuit from conductor 102, contact ACR*a*, switch 3PB, contact 2CRE*a*, winding of relay BCR to conductor 104. Relay BCR operates and seals in over a circuit including its contact BCR*a* and contact ACR*a*. Relay BCR, in operating, also closes its contact BCR*b* to connect conductor 102 to conductor 120 through contact ACR*a*.

Since contact TDR2*a* is at this time closed, the application of a voltage between conductors 120 and 104 will result in the immediate operation of relays CR1 and CR2. Relay CR1, in operating, opens its contact CR1*c* to release timer TDR1. Upon the de-energization of timer TDR1, its contact TDR1*a* (FIG. 3) again closes to re-energize the gas solenoids GSH and GSL and the water solenoid WS.

While this operation theoretically turns on both the gas and water, means are provided for insuring that both are being supplied as a condition precedent to further operation of the equipment. Thus, timer TDR2 (FIG. 2) is energized concurrently with the operation of relays CR1 and CR2 over a circuit including the normally closed contact WFS*a*, which is a contact of the water-pressure-differential sensing switch WFS hereinbefore mentioned. If water does not flow through the cooling jacket, contact WFSa remains closed, timer TDR2 operates after a selected time interval, and its contact TDR2a opens to release relays CR1 and CR2 to prevent further functioning of the equipment until the condition is corrected.

If, however, water does flow, the water pressure differential switch WFS opens its contact WFSa to de-energize timer TDR2 and closes its contact WFSb to energize lamp 4PL, to connote that the water is in fact flowing. Since timer TDR2 is de-energized prior to the expiration of its time delay interval, its contact TDR2a does not open and relays CR1 and CR2 remain operated.

If the energization of gas solenoids GSH and GSL (FIG. 3) does result in the flow of gas, pressure switch PS1 (FIG. 3) is closed. Since contact TDR1a is now closed, relay 11CR and the "gas-on" lamp 5PL are both energized. The closure of contact 11CRa (FIG. 2) completes a circuit including contact CR1a, contact 2CREc and the magnetic contactor WPC. As a result, contacts WPCa (FIG. 7) in lines L1, L2 and L3 are closed to initiate welding.

Arc length control

As a result of the closure of contacts WPCa (FIG. 7), a voltage is established between the electrode EL and the work W by equipment hereinafter to be described. The voltage between electrode EL and work W also appears across the winding of relay CR8, since contact CR1e is now operated. Relay CR8 is a voltage sensitive relay and has a minimum voltage for operating which is substantially greater than any operating arc voltage or drop. Since it is assumed that no arc is yet struck, relay CR8 operates.

Relay CR8, in operating, closes its contact CR8b (FIG. 2) to complete a circuit including now closed contact 13CRa, variable resistor 21P, and the primary transformer winding 29TP. As a result, the spark gap oscillator SGO (FIG. 7) is energized to produce, through transformer 30T, a high-frequency field between the electrode EL and the work W to assist in ionization. It will be noted that if high-frequency arc starting is employed, as is here assumed, the automatic head arc starter AHAS (FIG. 2) is disabled by opening switch SAS. The network 38C, 39C, 39R, and 40R provides a filtering network to prevent the high frequency from appearing at power supply sections.

The closure of contact CR8b also produces the operation of relay CR4 (FIG. 2) which performs certain control functions in the operation of the circuits shown in FIGS. 7 and 8 of the drawings, as will be described.

When relay CR1 operated, it also closed its contact CR1d (FIG. 3) to operate the automatic head raise-control relay CR7. Further, assuming that the automatic head is not now at its lower limit position, normally open limit switch LS2 (FIGS. 1 and 3) is open and relay CR5 is de-energized. Relay CR2 is energized concurrently with relay CR1 and closure of its contacts CR2a energizes the automatic head lower-control relay CR6 (FIG. 3). Since timer contacts 2CRCc (FIG. 3) are at this time closed, since contact CR5b is now closed, and since contact CR7a is closed due to the operation of relay CR7, the voltage between conductors 102 and 104 is applied across capacitor C12 and one of the automatic head motor field windings AHMFA (FIG. 3). Contacts 2CRCc are utilized to prevent the motor 52 from moving the electrode during current decay or slope down. Contacts CR5b open when limit switch LS2 is closed to prevent movement of the electrode EL toward the fixture 56 closer than a selected minimum distance. Capacitor C12 is utilized for phase shifting purposes. This energization of the winding AHMFA, plus additional functions performed as a result of the operation of relays CR6 and CR7, serves to initiate the functioning of the circuits represented in FIGS. 7 and 8 of the drawings.

The circuits represented on FIG. 8 and the lower portion of FIG. 7 of the drawings are generally conventional in nature and will be described in a somewhat general fashion, but the details are shown to ensure a complete understanding of the total system's operation.

The function of the dual section tube V3 (FIG. 8) is to compare the amplitude of the voltage between the electrode EL (FIG. 7) and the work W with a fixed reference voltage. The reference voltage is obtained by full-wave rectification, by tube V1 (FIG. 7), of the alternating voltage appearing across the secondary winding T1S2. The resultant direct voltage appearing between conductors 140 and 141 is filtered by means including choke X1 (FIG. 8) and capacitor C1 and C2, and is applied between conductors 140 and 142 and across resistor R1 and voltage regulating diode V2. The constant-amplitude voltage across diode V2 is applied across a voltage divider comprising resistor R2 and potentiometer P1, the total voltage across potentiometer P1 being applied through resistor R4 to the control grid of the left-hand section of tube V3.

The cathodes of both sections of tube V3 are connected to the return lead 140 through a self-biasing resistor R7, and the anodes are connected through individual load resistors R5 and R6 to the positive-potential conductor 142. The degree of conduction through the left-hand section of tube V3, and the potential at the anode thereof, are therefore relatively fixed at preselected values.

Figure 7:
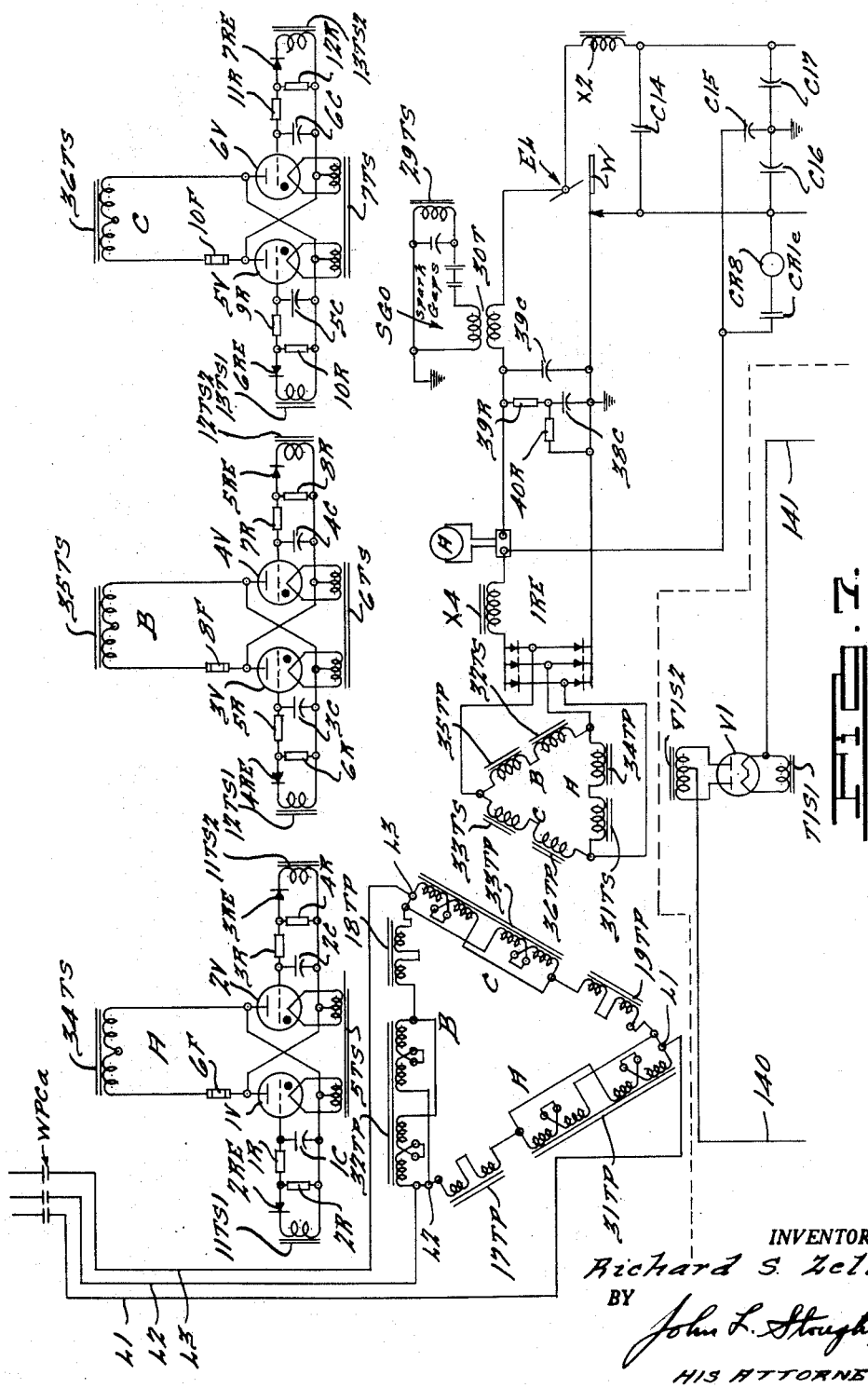
FIG. 7 is a schematic representation of a further portion of the welding current control apparatus and should be placed below FIG. 6 for proper orientation, and further includes a portion of the apparatus for controlling the length of the welding arc.
Figure 8:
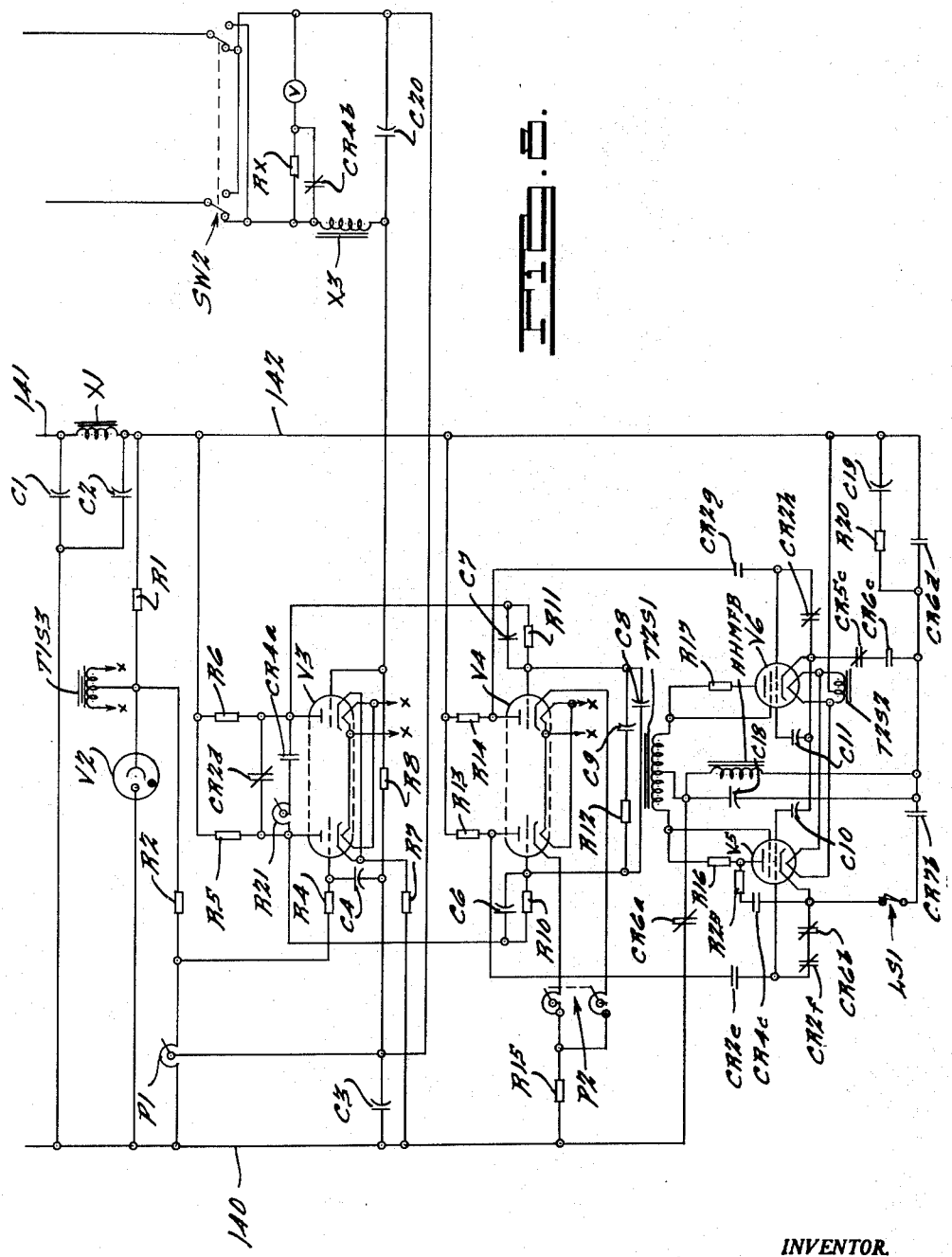
FIG. 8 is a schematic representation of the remainder of the arc length control apparatus and should be placed below FIG. 7 for proper orientation.

The arc voltage appearing between electrode EL (FIG. 7) and the work W is filtered by the choke-input filter shown in FIGS. 7 and 8 and applied across the parallel combination of capacitor 620 (FIG. 8) and resistor R8. Resistor R8 may therefore be considered as a voltage source in the input circuit of the right-hand section of tube V3, being connected in series with that portion of the potentiometer P1 between the moving element thereof and conductor 140. As a consequence, the conductivity, and hence the voltage at the anode, of tube V3 will be determined both by the arc voltage and the setting of potentiometer P1. If the actual arc voltage is equal to the desired arc voltage as established by the setting of potentiometer P1, the potentials at the two anodes of tube V3 will be equal. If the actual arc voltage is greater than the selected and desired arc voltage, the right-hand section of tube V3 will conduct more current than the left-hand section so that the anode of the right-hand section will be at a lower potential than that of the left-hand section, and conversely.

The signals at the anodes of tube V3 are coupled to and amplified by the two sections, respectively, of tube V4, potentiometers P2 being provided to vary the zero-signal bias on the two sections of tube V4 and hence to act as a sensitivity control.

Since relay CR2 (FIG. 2) is operated as previously described, contacts CR2e (FIG. 8) and CR2g are both closed so that the potentials at the anodes of the left and right-hand sections of tube V4 are direct-coupled to the control grid of tubes V5 and V6, respectively. Assuming that the head is not in its uppermost position (FIG. 1) so that limit switch LS1 is not open, the plate circuit of tube V5 is completed from the left-hand terminal of the secondary transformer winding T2S1, resistor R16, the anode-to-cathode path of tube V5, limit switch LS1, contact CR7b, and through the second automatic head motor field winding AHMFB to the center tap of transformer secondary T2S1. Similarly, assuming that the automatic head (FIG. 1) is not in its lower-most position so that limit switch LS2 is open, keeping relay CR5 (FIG. 3) deenergized and its contacts CR5c (FIG. 8) closed, the plate circuit of tube V6 is similarly completed from the right-hand end of the transformer secondary winding T2S1, resistor R17, the anode-to-cathode path of tube V6, contacts CR5c and CR6c and through the field winding AHMFB to the center tap of the secondary winding T2S1.

The automatic head motor is an induction motor with two separately excited field windings, windings AHMFA (FIG. 3) and AHMFB (FIG. 8). By virtue of the capacitor C12 in series with the winding AHMFA and the absence of such an impedance in winding AHMFB, the currents in these two field windings are permanently 90° out of phase with one another. Tubes V5 and V6 rectify the voltage applied thereto and hence pass alternate half cycles, so that the current through winding AHMFB, resulting from conduction by tube V5, is 180° out of phase with the current therethrough resulting from conduction by tube V6. Hence, while the current through the automatic head motor field winding AHMFB will be permanently 90° out of phase with the current through the other winding, whether the effective current through winding AHMFB leads or lags the current through the winding of current AHMFA is determined by the relative conductivities of tubes V5 and V6 which, through the before-described concatenations, is determined by the relationship between the actual arc voltage and the preselected arc voltage. Therefore, the automatic head motor will stand fast, or turn in one or the other of two directions, depending upon these voltage relationships.

Prior to the initiation of the arc, the voltage between the electrode EL (FIG. 7) and the work W is much higher than the preselected arc voltage. This voltage unbalance will cause the circuits of FIG. 8 and the bottom portions of FIG. 7 to drive the electrode EL (FIG. 1) downwardly toward the work W. Assuming high frequency starting is employed, as described, at some point prior to the time at which the electrode strikes the work, the arc will be formed. This will result in immediate reduction of the arc voltage relative to the selected arc voltage and the automatic head motor will be correspondingly controlled to adjust the two voltages to equality.

Since the selected arc voltage is lower than the hold value of relay CR8 (FIG. 7), that relay releases. Relay CR8, in releasing, opens its contact CR8b (FIG. 2) to terminate the operation of the spark-gap oscillator SGO (FIG. 7) and to release relay CR4 (FIG. 2). Relay CR4, in releasing, closes its contact CR4b (FIG. 8) to bypass resistor RX thereby to shift the voltmeter V to a more sensitive scale so that voltmeter V may, before the arc is struck, read the relatively high electrode-to-work voltage, and yet may read the substantially lower voltages after the arc is struck on a full-scale basis. Relay CR8 (FIG. 7), in releasing, also affects the operation of certain timers as will be described.

It will be appreciated that while both relays CR6 (FIG. 3) and CR7 are concurrently operated as an incident of the automatic operation of the device, their contacts are functionally located in the circuit of FIG. 8 so that if relay CR7 (FIG. 3) is operated and relay CR6 is not operated, the head motor will drive the welding electrode upwardly, while if relay CR6 is operated and relay CR7 is also operated, the welding electrode is caused to descend. The former of these characteristics is employed in controlling the equipment when one limit position is reached and both of these characteristics are employed in the manual control of the apparatus prior to the automatic phases of operation. Thus, if the automatic head reaches its lower limit so as to close limit switch LS2 (FIGS. 1 and 3), relay CR5 (FIG. 3) is operated to open its contacts CR5a to release relay CR6. As a consequence, the welding electrode is automatically moved upwardly. In the manual phases of control, prior to the operation of relay BCR (FIG. 2), the voltage between conductors 106 and 104 may be selectively applied across relay CR7 (FIG. 3) or relays CR6 and CR7 by the automatic head control switch AHCS to cause the welding electrode to be moved upwardly or downwardly, respectively. It will be further noted that if either during the manual or automatic phases of operation the head reaches its upper limit so as to open limit switch LS1 (FIGS. 1 and 8), the plate circuit of tube V5 is interrupted so that the motor will not be overdriven and so that travel will terminate.

*Weld current control*

When contacts WPCa (FIG. 7) are closed as previously described, the three-phase alternating voltage appearing between conductors L1, L2 and L3 is applied across a delta connected transformer array. Thus, the A voltage phase appearing between conductors L1 and L2 is applied across the serially interconnected transformer primary windings 31TP and 17TP, the B phase appearing between conductors L2 and L3 is applied across the serially interconnected transformer primary windings 32TP and 18TP, and the C phase appearing between conductors L3 and L1 is connected across the serially interconnected transformer primary windings 33TP and 19TP. The windings 31TP to 33TP, with their respective, delta-connected secondaries 31TS to 33TS, are the energy transferring devices for the welding operation. Each of the secondary windings 31TS to 33TS is, however, serially interconnected with a controlling or regulating transformer primary winding 34TP to 36TP, respectively, which function in a manner hereinafter to be described.

The regulated-amplitude output current of all three phases is rectified by a dry-disc rectifier array 1RE, is filtered by means including choke X4 and appears as an arc current (assuming the arc has been struck) between the electrode EL and the work W.

Figure 6:
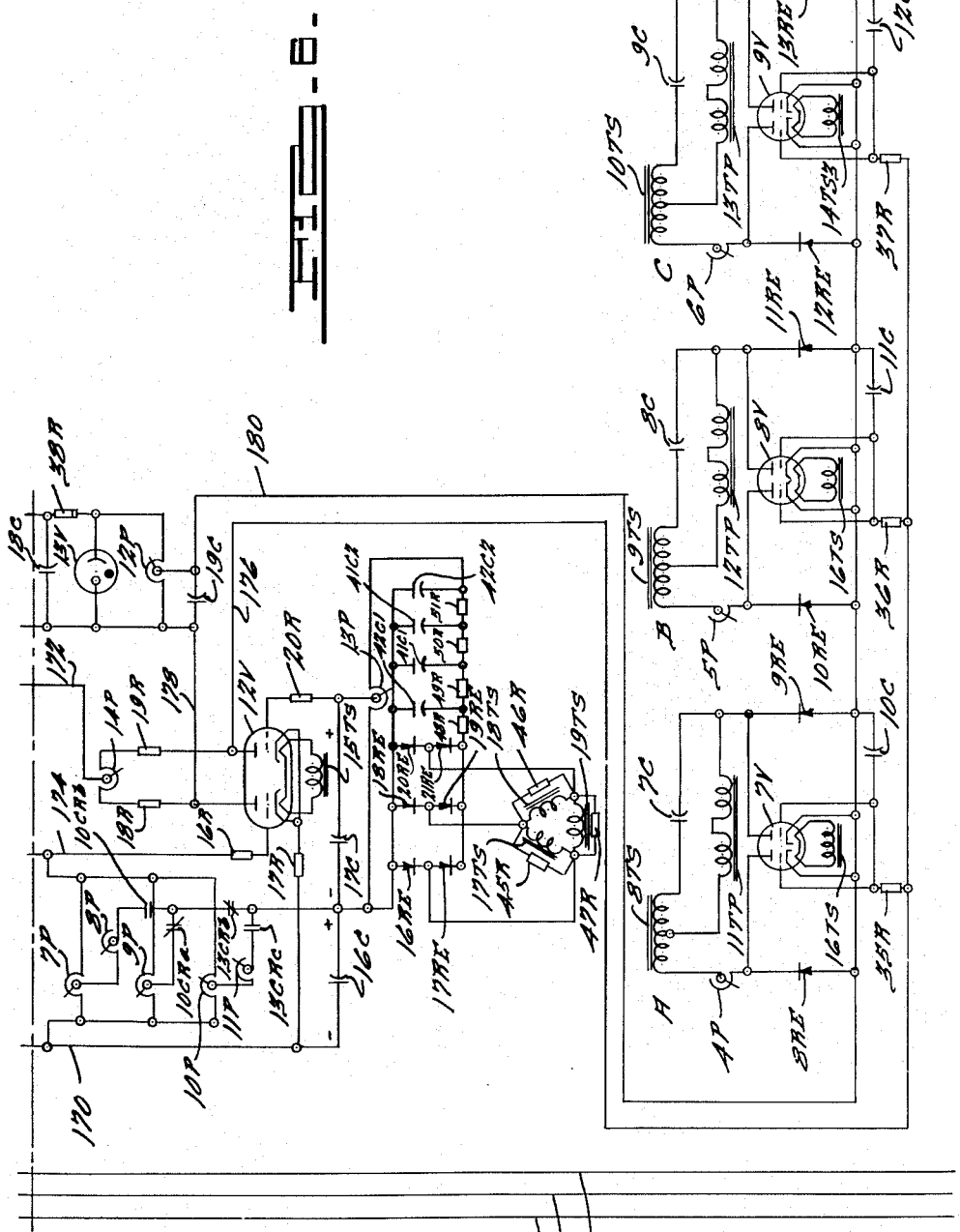
FIG. 6 is a schematic representation of a further portion of the apparatus for controlling the amplitude of the welding current, and should be placed below FIG. 5 for proper orientation.

As was noted in the introductory portion of this specification, the value of the current between the welding electrode EL and the work W may vary even though means are provided for maintaining a constant (or relatively constant) arc voltage. The preferred and disclosed means for maintaining a constant welding current, or a welding current which varies in a predetermined and preselected manner, is shown in FIGS. 5 to 7 of the drawings.

Transformer primary windings 17TP, 18TP and 19TP, connected as described, serve as the means for sensing the amplitude of the primary-winding current in each of the phase branches, primary winding 17TP in effect sensing the amplitude of the current through the A-phase primary winding 31TP, primary winding 18TP in effect sensing the amplitude of the current through the B-phase primary winding 32TP, and winding 19TP in effect sensing the amplitude of the primary current through the C-phase primary winding 33TP. Consequently, there is produced in each of the respective secondary windings (FIG. 6) 17TS, 18TS and 19TS, a voltage which is proportional to the amplitude of the current in the primary windings 31TP (FIG. 7), 32TP and 33TP, respectively, these voltages being applied across individual loading resistors 45R, 46R and 47R, respectively.

In this specification, the terms "primary" and "secondary" as applied to transformers are employed in their functional sense rather than in their design sense. Thus, for example, a step-down filament transformer having a design primary for connection to the line and a design secondary for connection to filaments may be and herein is employed reversely as a step-up transformer, and hence its design primary is a functional secondary and will be labeled a secondary, and conversely.

The output current from secondary winding 17TS (FIG. 6) is rectified by dry-disc rectifiers 16RE to 19RE, the output current from secondary winding 18TS is rectified by rectifiers 18RE to 21RE, and the output current from secondary 19TS is rectified by rectifiers 16RE, 17RE, 20RE and 21RE, producing a direct voltage across the load comprising the resistive portion of potentiometer 13P. The portion of this voltage appearing between the left-hand end of the resistive portion and the movable element of potentiometer 13P is applied across capacitor 17C for a purpose hereinafter to be noted. It will be observed that the elements 48R–51R and 41C1, 41C2, 42C1 and 42C2 serve as a filter.

Tube 12V serves to compare a fixed-amplitude direct voltage with a voltage having as one of its components the signal voltage appearing across capacitor 17C and as another of its components the voltage appearing across capacitor 16C. The voltage across capacitor 16C is preferably selectable both as to a plurality of steady-state values and as to the rate of transition between steady-state values. Potentiometers 7P, 9P and 10P, variable resistors 8P and 11P, and relay contacts 10CRa, 10CRb, 13CRb and 13CRc cooperatively control the portion of a fixed voltage which is applied across capacitor 16C and the rate at which that voltage across capacitor 16C is caused to change.

The fixed-voltage source consists of elements represented primarily in FIG. 5 of the drawings. The voltage appearing across secondary winding 14TS1 is rectified by full-wave rectifier 10V and applied across capacitor 13C. This voltage is filtered by means including resistor 13R and capacitor 14C, with the voltage appearing across the latter, and hence between conductors 170 and 172, constituting the B voltage for tube 12V (FIG. 6). Thus, the two cathodes of tube 12V are connected through self-biasing resistor 17R to conductor 170, and the two anodes of tube 12V are connected through individual load resistors 18R and 19R and through the balancing potentiometer 14P to conductor 172.

The voltage between conductors 170 and 172 is also applied across the serially interconnected resistor 14R (FIG. 5) and voltage regulating diode 11V, and the resultant constant direct voltage across diode 11V is applied across the serially interconnected resistor 15R and capacitor 15C, to produce a voltage between conductors 170 and 174, with the latter being positive relative to the former. The voltage on conductor 174 is applied through resistor 16R (FIG. 6) to the control grid of the left-hand section of tube 12V, producing a flow of current in the plate circuit of the left-hand section of tube 12V and a voltage drop across load resistor 18R. While this current and voltage drop appears to be constant from the circuit elements thus far described, an additional signal is applied to this section of tube 12V so that the current through the tube and the voltage across load resistor 18R will vary, as will be seen.

The voltage between conductors 170 and 174 is also applied, in parallel, across the resistive portions of potentiometers 7P, 9P and 10P. Potentiometer 9P (assuming it to be effective, as will be described) controls the initial current and hence, the initial heat, potentiometer 7P controls the running current, and hence the running heat, and potentiometer 10P controls the final current, and hence the final heat.

If it is desired to disable the control capabilities of the initial heat potentiometer 9P, and start at a current and heat determined by the setting of potentiometer 7P, the "up slope" switch 6SW (FIG. 2) is moved into engagement with its lower contact whereupon relay 10CR will be operated as soon as the control-on switch 1PB is operated to operate relay ACR to close its contacts ACRa. However, it will be assumed that it is desired to take full advantage of the capabilities of the system so that the up-slope switch 6SW is in its uppermost position as shown.

In that case, at the time the arc is first struck, relay 10CR, as well as relay 13CR, is still released. As a result, contacts 10CRa (FIG. 6) and 13CRb are closed, while contacts 10CRb and 13CRc are open. Hence, at this time the voltage appearing between the moving element (in its preselected position) of potentiometer 9P and conductor 170 is applied across capacitor 16C. In one mode of operation of the system, after the arc is struck and the arc voltage is reduced to a value to cause the release of relay CR8 (FIG. 7), a circuit is completed from the conductor 102 (FIG. 2), through the now-closed contact CR1a, through the now-closed contact CR8a, through switch USD (assumed to be closed to its No. 1 contact), through the upslope switch 6SW, and through the winding of relay 10CR to conductor 104 whereby relay 10CR is operated.

The resultant opening of contact 10CRa (FIG. 6) relieves potentiometer 9P of control over the voltage across capacitor 16C. The closure of contact 10CRb causes the voltage between the movable element of potentiometer 7P and conductor 170 to be applied across a circuit including variable resistor 8P and capacitor 16C. Assuming, as is normally the case, that the setting of potentiometer 7P is different from that of potentiometer 9P, the voltage across capacitor 16C must change, the rate of this change being established, in part, by the setting of variable resistor 8P, whereby the "up slope" time is determined. Capacitor 16C then discharges to a value established by potentiometer 7P.

In an alternative mode of operation of the system, the up-slope delay switch USD (FIG. 2) is closed to its No. 2 contact. Consequently, the closure of contacts CR8a will not produce the immediate operation of relay 10CR, but will energize start lead SLab to energize the weld travel delay times TDA (FIG. 3). At the expiration of the set delay interval, contact 2CRAb is closed to complete a circuit from energized conductor 106, now-closed contacts TD2a and 2CRAb, conductor 129, No. 2 contact and swinger of switch USD (FIG. 2), upper contact and swinger of switch 6SW and the winding of relay 10CR. Hence, the weld current is maintained at the initial-heat level for a preselected interval to permit the building of a selected molten pool. If it is desired that the delay between the release of relay CR8 and the operation of relay 10CR be controllable independently of the weld travel delay interval, a separate timing unit may be provided. Thus, as a specific example, an additional timer such as that represented in FIG. 11 of the drawings may be connected between conductors 102 and 104, with its start lead SL connected to start lead SLab (FIG. 3). Switch USD (FIG. 2) may be eliminated and the conductor between its moving element and the upper contact of switch 6SW may be omitted. The upper contact of switch 6SW may then be connected to conductor 106 through a normally open time-delay contact, of the adder timer unit, i.e., through a normally open contact of the relay 2CR (FIG. 11) in that added timer.

Potentiometer 7P continues to control the amplitude of the welding current until a time somewhat after that at which limit switch LS4 (FIGS. 1 and 4), as an example, is tripped to closed position to initiate the current decay operation. When limit switch LS4 (FIG. 4) is closed, the current decay delay unit TDC is energized over a circuit from conductor 102 (FIG. 2), contacts ACRa and BCRb, conductor 120, limit switch LS4 (FIG. 4), and the start lead SLc. Unit TDC seals in, and, after the preset time interval, closes its contacts 2CRCa to energize the tailing time delay unit TDE, which seals in. At the instant of energization of unit TDE, its contact 1CREb (FIG. 2) closes to operate relay 13CR, assuming that switch 7SW is closed.

Relay 13CR, in operating, opens its contact 13CRb (FIG. 6) to relieve potentiometer 7P of control over the voltage across capacitor 16C, and closes its contact 13CRc so that the voltage appearing between the movable element of the final-heat potentiometer 10P and conductor 170 is applied across variable resistor 11P and capacitor 16C. Capacitor 16C will charge to a new value, set by potentiometer 10P, at a rate determined by the setting of the down-slope-control variable resistor 11P.

It will be observed that the final heat potentiometer 10P and the down-slope time variable resistor 11P may be disabled to perform their functions by opening switch 7SW (FIG. 2) in the energizing circuit of relay 13CR, in which case the final heat will remain the same as the run heat, as established by potentiometer 7P.

The sum of the voltages across capacitors 16C and 17C is applied as a signal to the input circuit of the right-hand section of tube 12V. Thus, the input circuit of that section may be traced from the grid thereof, current limiting resistor 20R, capacitor 17C, capacitor 16C, and resistor 17R to the cathode of that section. Therefore, the input signal to the right-hand section of tube 12V includes one component, the voltage across capacitor 17C, which is varying in amplitude as a function of the current in the primary windings of the welding transformer, and another component, the voltage across capacitor 16C, which is fixed or varying in a preselected manner and in accordance with the status of the welding operation.

This composite input signal produces a resultant variation in the current flow in the plate circuit of the right-hand section of tube 12V and a consequent variation in the anode potential thereof, due to the voltage drop across load resistor 19R, which is applied as an output signal to conductor 176. As the current in the primary windings of the welding transformer increases, as an example, the voltage across capacitor 17C increases to produce an increased plate current in the right-hand section of tube 12V and a consequent reduction in the amplitude of the output voltage on conductor 176, and a similar result obtains if the voltage across capacitor 16C increases. This change in the amplitude of the plate current in the right-hand section of tube 12V will produce a corresponding change (increase) in the voltage drop across bias resistor 17R and will thereby change (increase) the voltage of the cathode of the left-hand section of tube 12V, producing a change in the bias of that section and a consequent change (increase) in the output voltage signal applied to conductor 178. It will be observed that the direction of the change of voltage on conductor 176 is opposite to the direction of change of voltage on conductor 178. Thus, this cathode coupling serves to emphasize the signal changes, so that a given change in the amplitude of the input signal will produce a greatly magnified change of the potential difference between conductors 176 and 178.

The output signal voltage appearing between conductors 176 and 178 is modified by the addition of a fixed, positive biasing potential to the potential on conductor 178. Thus, the line voltage appearing across the secondary winding 14TS3 (FIG. 5) is rectified by dry disc rectifiers 14RE and 15RE and applied across capacitor 18C (FIG. 6) as well as across the serially interconnected resistor 38R and voltage regulating diode 13V, and the resultant constant direct voltage across tube 13V is applied across the resistive portion of potentiometer 12P. A selected portion of this total available voltage is applied across capacitor 19C which is connected between conductors 178 and 180. Hence, even under conditions of exact equilibrium of the two sections of tube 12V wherein the voltage difference between conductor 176 and 178 is zero, conductor 180 is positive relative to conductor 176 by an amount equal to the voltage across capacitor 19C.

The potential difference existing between conductors 180 and 176 is employed to control the conductivity and hence the effective resistance offered by, the dual triodes 7V, 8V and 9V. Each pair of control grids of each of these tubes is connected through an individual current limiting resistor 35R, 36R and 37R to conductor 176, and all of the cathodes of these three tubes are connected to conductor 180. It will be observed that even when the output of the two sections of tube 12V is balanced, each of the tubes 7V to 9V is biased negatively by an amount equal to the voltage across capacitor 19C.

Each of the individual circuits including tubes 7V, 8V and 9V, respectively, is individual to one of the three power-supply phases A, B and C, respectively, and serves to produce an output signal which is shifted in phase relative to the particular power-supply phase with which it is associated, the amount of that phase shift varying as a function of the amplitude of the direct-voltage signal applied to the individual tube's input circuit.

Referring to FIG. 5 of the drawings, power-supply phase A appearing between conductors L1 and L2 is applied across the transformer primary winding 8TP, phase B appearing between conductors L2 and L3 is applied across the transformer primary winding 9TP, and phase C appearing between line conductors L3 and L1 is applied across the primary transformer winding 10TP. The associated secondary windings (FIG. 6) 8TS, 9TS and 10TS are operatively associated with tubes 7V, 8V and 9V, respectively.

Considering the circuit including tube 7V, the A-phase alternating voltage appearing across the secondary winding 8TS is, in effect, applied across a serially interconnected reactance and resistance, with the output being taken between the point of junction of the reactance and resistance and the center tap of the transformer winding 8TS. Capacitor 7C serves as the reactive element and is connected to the right-hand terminal of the secondary winding 8TS. The dual-section tube 7V, dry disc rectifiers 8RE and 9RE, and variable resistor 4P compositely serve as the resistive element, which is variable in magnitude to produce a selected degree of phase shift. The output signal is derived from the primary transformer winding 11TP which is connected between the center tap of winding 8TS and the point of junction of the capacitor 7C and the resistive network. During one half cycle of the applied voltage across transformer secondary 8TS (that half cycle during which the right-hand terminal of secondary 8TS is positive relative to the left-hand terminal) the resistive path includes the anode and cathode of the right-hand section of tube 7V, rectifier 8RE, and variable resistor 4P. During the other half cycle of the voltage across transformer secondary 8TS, the resistive path includes variable resistor 4P, the anode and cathode of the left-hand section of tube 7V and rectifier 9RE.

As is well known, the amount of phase shift may be varied by varying the magnitude of the resistive component, and the magnitude of this resistive component may, in effect, be varied by changing the direct voltage applied to the input circuits of the two sections of tube 7V. If the input signal to tube 7V is such as to render the grids sufficiently negative relative to the cathodes to render the tube effectively non-conductive, the resistance offered is very high and the phase shift is maximum. With the parameters employed in a practical embodiment of the invention, this maximum phase shift may amount to about 135°. As the negative bias on tube 7V is reduced, its effective resistance is correspondingly reduced, so that as tube 7V approaches saturation, the angle of phase shift approaches zero degrees.

Therefore, an increase in current in the power transformer windings (FIG. 7) 31TP, 32TP and 33TP will cause the grids of tube 7V (and of the corresponding tubes in the other phase shifting circuits) to become more negative relative to their cathodes, increasing the phase shift. Conversely, a decrease in the amplitude of the sensed signal will cause the control grids of tube 7V to become less negative relative to their cathodes and the amount of phase shift will be reduced.

The phase shifting circuit including tube 8V, individual to voltage phase B, and the circuit including tube 9V, individual to phase C, function identically to that of the phase A circuit described. The operation of these three circuits may be precisely balanced by adjusting the position of the variable resistors 4P, 5P and 6P.

The output signal from each of these phase shifting circuits is employed to control the firing angle of a pair of thyratrons individual to each of the phase-shift circuits and individual to each of the voltage phases. Thus, thyratrons 1V and 2V (FIG. 7) are individual to voltage phase A and individual to the phase A shifter including tube 7V, thyratrons 3V and 4V are individual to voltage phase B and to the B phase shifter including tube 8V, and thyratrons 5V and 6V are individual to voltage phase C and to the C phase shifter including tube 9V.

Considering the A-phase thyratron circuit, energy is supplied to the thyratrons 1V and 2V through the secondary transformer winding 34TS, the primary winding 34TP of which is serially included with the A-phase power secondary winding 31TS, as before noted. Hence, a voltage is applied to the anodes of thyratrons 1V and 2V which corresponds to the voltage phase A. Since each of the thyratrons 1V and 2V is connected across the winding 34TS, the average current amplitude through winding 34TS may be controlled by controlling the firing angle of those thyratrons, and the firing angle can in turn be controlled by varying the phase relationships between the grid and anode voltages.

Thus, an input signal is applied to the secondary transformer windings 11TS1 and 11TS2 via transformer primary 11TP (FIG. 6). It is assumed, as an example, that these alternating voltages at the transformer secondaries lag the respective alternating plate voltages by an angle approaching zero degrees as a minimum and 135° as a maximum. The voltage appearing across the secondary winding 11TS1 is applied between the grid and cathode of thyratron 1V through a network including rectifier 2RE, resistors 1R and 2R and capacitor 1C, and the voltage appearing across the secondary winding 11TS2 is applied between the control grid and cathode of thyratron 2V through a network including rectifier 3RE, resistors 3R and 4R, and capacitor 2C. The function of rectifiers 2RE and 3RE is merely to insure that the control grids will not be driven positive at a time when the respective anodes are negative.

The amplitude of the average current in the transformer secondary winding 34TS controls the amplitude of the average current through the corresponding primary winding 34TP, and thereby controls the average current through the power secondary winding 31TS. Otherwise stated, the firing angle of thyratrons 1V and 2V controls the reactance of the transformer primary winding 34TP and hence the impedance offered by that primary winding to the flow of current through the power secondary winding 31TS.

Reviewing the entire concatenation, and considering, as an example, a change in one direction of the current in but one of the phases, an increase in the welding arc circuit current represents an increase in the alternating current in the A-phase power secondary winding 31TS, which produces an increase in the current in the A-phase primary transformer winding 31TP. As a consequence, there will be an increase in the current in the A-phase signal-sensing transformer primary winding 17TP, resulting in an increased current through the secondary winding 17TS (FIG. 6) and an increased voltage across capacitor 17C. The increase in voltage across capacitor 17C (assuming the voltage across capacitor 16C to be constant at the instant) produces a reduction in the voltage on conductor 176 and an increase in the voltage on conductor 180 which reduces the conduction and increases the effective resistance of tube 7V. As a result, the angle by which the grid-to-cathode voltage of each of the thyratrons 1V and 2V (FIG. 7) lags the anode-to-cathode voltage of each of those tubes is correspondingly increased, so that the average current through the secondary winding 34TS and the primary winding 34TP is correspondingly reduced. This results in a reduction in the current through the A-phase power transformer secondary winding 31TS (and hence across the arc), producing a compensating reduction in the current through the power transformer A-phase primary winding 31TP.

In a similar fashion, the B-phase-shifting circuit including tube 8V (FIG. 6) controls the firing angle of thyratrons 3V and 4V (FIG. 7) to vary the reactance of transformer primary winding 35TP to control the current through the B-phase power transformer secondary winding 32TS and primary winding 32TP, and the C phase shifter (FIG. 6) including tube 9V controls the phase angle of thyratrons 5V and 6V (FIG. 7) to vary the reactance of the primary winding 36TP thereby to vary the flow of current through the power transformer C-phase secondary winding 33TS and primary winding 33TP.

It will be appreciated that these compensating actions occur substantially instantaneously in a practical operating system. It will further be appreciated that variation in the voltage across capacitor 16C (FIG. 6) as established by the before-described control means including potentiometers 7P, 9P and 10P, variable resistors 8P and 11P and the controlling relay contacts, will similarly produce a change in the arc current, an increase in the voltage across capacitor 16C producing the same results as an increase in the voltage across capacitor 17C, and conversely.

It is the applicant's belief that the insertion of the current-controlling transformer primaries 34TP, 35TP and 36TP in the phases, e.g., in series, respectively, with the individual power-transformer secondaries 31TS, 32TS and 33TS, is of primary significance in the achieving of maximum precision and maximum range of control. The placing of reactors in the output lines interconnecting the secondaries 31TS to 33TS and the rectifier array 1RE produces substantially less satisfactory results in three-phase use, since the composite, two-phase current through each reactor, as modified by the firing angle of the controlling thyratrons, produces pulsations of current in the reactor which adversely affect the accuracy of control and appear as variations in the arc current of such magnitude as to produce beads which are detectably uneven to the unaided eye. This unbalanced control of the current tends to produce, with a three-phase, 60 c.p.s. input, a 60 c.p.s. ripple frequency at the arc, whereas the balanced current-controlling system herein disclosed produces a 360 c.p.s. ripple frequency and a smooth bead appearance. Thus, the applicant has found it better to control the output phase currents than to control the output line currents.

It is also the applicant's belief that it is important to optimum performance that the pick-up or signal-sensing transformer primaries 17TP, 18TP and 19TP be in the individual phase legs, as shown, as opposed to placing one or more such sensing devices in series in the line or lines L1, L2 and L3. Thus, the applicant has found it better to sense the input phase currents than the input line currents.

The applicant further believes that as long as judgement is exercised in employing transformers having proper power-handling capabilities, satisfactory results can be achieved with sensing, power and controlling transformers of a variety of types. For example, conventional filament transformers can be successfully employed as the signal sensing devices, with the normal "primary" windings being employed as the secondaries 17TS and 19TS and with the normal "secondary" windings being employed as the primaries 17TP to 19TP, i.e., a step-down filament transformer can be successfully reversed and employed as a step-up sensing transformer. Further, good current control over a substantial load-current range may be achieved with a variety of types of power transformers 31T to 33T and controlling transformers 34T to 36T, and such results have been obtained, for example, where all the power and controlling transformers have been identical in design.

The applicant has found, however, that with certain transformers the stability and range of current control is better than with others. The conclusion has been reached and the theory here advanced, that optimum results, from these standpoints, can be achieved if the shift or swing of reactance of the control transformer primaries 34TP to 36TP with changes in the current in the secondary windings 34TS to 36TS (or with changes in the load on these secondaries) is large relative to the shift or swing of reactance of the power transformers 31T to 33T with current changes. He has also found that a greater range of control is achieved where the output voltage of the power transformers 31T to 33T varies appreciably with variations in load but where the control transformers 34T to 36T have a relatively flat voltage characteristic with load changes. These differences in reactance-swing characteristics and in voltage characteristics may be alternatively or conjointly significant, but the applicant believes the former to be most important.

While the reasons for the improved performance with certain transformer combinations are not definitively established, the applicant has found, pragmatically, that the arc current can be controlled most precisely, that the control mechanism operates with the greatest stability and that a controlled variation in arc current (by potentiometers 7P to 10P) over a range of from under 5 amperes to over 400 amperes can be obtained by employing certain sets of power and control transformers having the following representative characteristics:

Each power transformer 31T to 33T has an EI, nickel steel, laminated core in which the lamination stack is 5 inches high, in which the I and the back and outer legs of the E are 1¼ inches wide, in which the center leg of the E is 2½ inches wide and 5¼ inches long, and in which the I is 10 inches long. The four primary windings (connected for 230 or 460 volt supply) each have 110 turns of No. 12 round wire, while the two secondaries are each wound with 33 turns of No. 4 square wire to give a no-load output of 67 volts. Room is left for a $9/16$ inch stack of laminations to be inserted between windings as a magnetic shunt. This transformer has a sloping voltage characteristic with load.

Each controlling transformer 34T to 36T comprises two "0" cores bound together side-by-side, with the windings wound about the abutting legs. The core is laminated, of grain-oriented silicon steel (Hipersil), and the cross-sectional area of the center leg is 14½ square inches. The "primary" consists of two pi-wound, 230-volt windings each having 57 turns of No. 11 square copper wire. The "secondary" is of 0.020 inch-thick sheet copper 2¼ inches wide wound 17 turns over the primary, producing a cross-sectional area of secondary copper of 1135 circular mils per ampere. The no-load secondary voltage is 68 volts and the voltage characteristic with load is essentially flat. The transformer has a very large swing in the reactance of its "secondary" (used in the disclosed circuit as a primary) with changes in load on and current in its "primary" (used in the disclosed circuit as a secondary).

It will be noted that if both the power and the current controlling transformers are of the first-described type, the maximum current is in the order of 300 amperes with the same circuit, otherwise, as that in which the diverse arrangement produced a maximum current of over 400 amperes. It will further be noted that if both the power and controlling transformers are of the latter type, the range of control is large, but the stability is less than with the preferred arrangement, small changes in the reactance of the controlling transformers producing relatively great shifts in arc-current amplitude.

While the most satisfactory transformers discovered to date have been described in some detail, it is to be recognized that the principles of the invention may be practiced by employing any of a number of types of transformers and that they need not be different from one another in any given respect, nor different in the noted respects. Hence, the disclosure in detail, of an operative, highly successful arrangement, the best mode contemplated of carrying out the invention, is not to be construed as connoting that other arrangements cannot be employed in the practice of the invention, nor to be considered as limiting the scope of those principles.

*Carriage motor control*

The motion of the carriage 42 (FIG. 1) may be controlled manually, and automatic means are or may also be provided for controlling the carriage motor 46 (FIG. 1) to control the time at which the carriage 42 commences to move, the initial rate of movement of the carriage, the running speed of the carriage, the rate of acceleration or deceleration between the initial and running speeds, and the point of which motion of the carriage 42 will terminate. Both the manual and the automatic control of the carriage motor is exercised through the circuits of FIG. 9.

In order that the carriage motor may be manually controlled, switch 11SW (FIG. 4) is closed to energize signal lamp 7PL and time-delay relay TD2. It will be recalled that when power is connected between conductors 102 and 104 (FIG. 2) and when the control-on switch 1PB has been depressed to produce the operation of relay ACR, the voltage appearing on conductor 102 is applied to conductor 106. Hence, when relay TD2 (FIG. 4) operates, after the preset time interval, the voltage on conductor 106 is applied through contact TD2a (FIG. 3), and through the normally closed contact 2CRAa to the wiper of the carriage jog switch 108 to permit the selective operation thereby of the "forward" carriage motor control relay 14CR or the reverse carriage motor control relay 15CR, each of which controls the circuits of FIG. 9 in a manner to be described. Forward motion of the carriage 42 (FIG. 1) is terminated when limit switch LS3 (FIGS. 1 and 3) is tripped to interrupt the circuit of relay 14CR, and limit switch LS5 similarly controls relay 15CR to limit reverse or leftward motion of the carriage.

Figure 9:
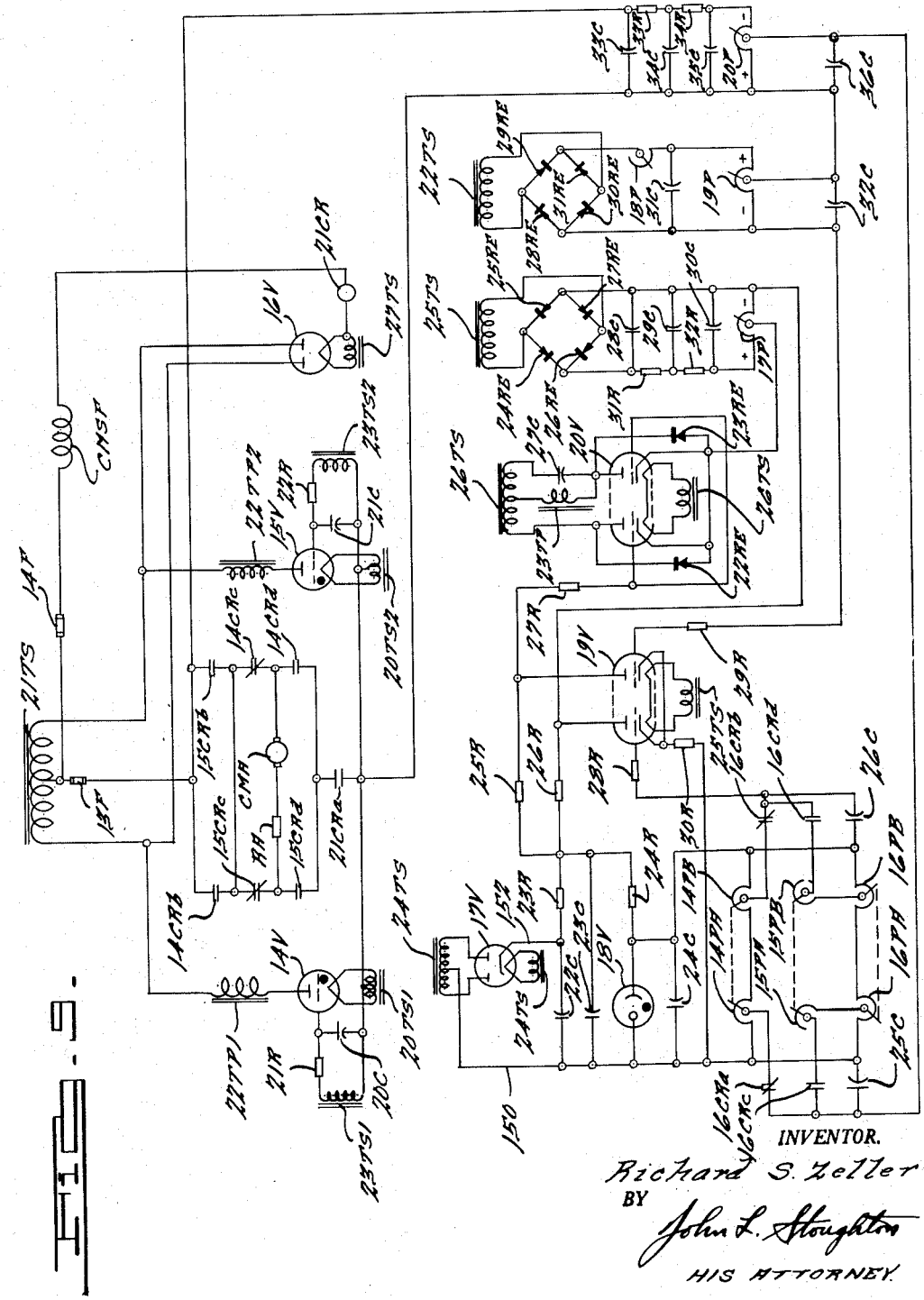
FIG. 9 is a schematic representation of the electrical apparatus for controlling the motion of the carriage, an element of the apparatus of FIG. 1.

The entire supply of power to the carriage-motor control equipment represented in FIG. 9 of the drawings is under the control of the carriage motor switch 11SW (FIG. 4). Thus, the application of the alternating voltage appearing between conductors 102 and 104 to primary windings 24TP, 25TP, 26TP and 27TP is directly controlled by the switch 11SW. Additionally, the closure of switch 11SW results in the operation of relay CCR, the contacts CCRa and CCRb (FIG. 5) of which are in the circuit of the primary winding 20TP and the contacts CCRc and CCRd of which are in the circuit of the primary winding 21TP. The secondary windings of all of these transformers are included in the system of FIG. 9.

At the initiation of the automatic control of the welding operation, the momentary operation of switch 3PB (FIG. 2) and the consequent operation of relay BCR, relay CR1 operates, as previously described, to prepare a circuit for the energization of the start lead SLab of the weld travel delay timer TDA (FIG. 3) (as well as of timer TDB). As was also previously described, when the arc is struck, relay CR8 (FIG. 8) releases to close its contacts CR8a (FIG. 2) to complete this energizing circuit. After the elapse of the preset time interval, unit TDA opens contact 2CRAa (FIG. 3) to terminate manual control of the carriage motion via switch 108, and closes contact 2CRAb to connect power to the movable element of switch 126, assuming the carriage-positioner selector switch 15SW to be in its No. 1 position. Switch 126 is preset in its upper or lower position in accordance with whether the desired weld travel is in one direction (e.g. to the right) or another (e.g. to the left). Hence, either relay 14CR or 15CR will be operated. It will be noted that the resultant closure of either contact 14CRa (FIG. 3) or 15CRa (or the disabling of the acceleration control circuit by the prior closing of switch 10SW) produces the operation of the acceleration control relay 16CR. However, as will be noted, certain functions occur during the time lapse between the energization and the operation of relay 16CR.

It is assumed that the carriage drive motor is a compound wound, D.C. motor having an appropriately energized series field winding (not shown), a shunt field winding CMSF (FIG. 9), and an armature CMA. The shunt field winding CMSF (FIG. 9) is energized by direct current produced by the full-wave rectification, by tube 16V, of the alternating voltage appearing across the secondary winding 21TS. This shunt field current also flows through the winding of relay 21CR to energize that relay and produce the closure of contact 21CRa which is connected in series with the carriage-motor armature CMA.

If either relay 14CR (FIG. 3) or 15CR is operated, as before described, the armature CMA is energized. Thus, assuming relay 14CR to be energized whereby contacts 14CRb (FIG. 9) and 14CRd are closed and contact 14CRc is open, armature CMA is energized by direct current flowing as a result of the full-wave rectification of the voltage appearing across transformer winding 21TS by thyratrons 14V and 15V. The amplitude of this current, and hence the speed of the carriage motor, is controlled by the firing angles of thyratrons 14V and 15V, and these firing angles are in turn controlled by the remainder of the equipment shown in FIG. 9 of the drawings.

A direct voltage is developed across capacitor 22C and between conductors 150 and 152 by rectification of the alternating voltage appearing across secondary winding 24TS by full-wave rectifier 17V. This voltage is employed as the B supply for tube 19V. Thus, the anodes of tube 19V are connected through individual load resistors 25R and 26R and resistor 23R to conductor 152 and the cathodes are connected through biasing resistor 30R to conductor 150. The voltage across capacitor 22C is also applied across the series combination of resistor 23R, resistor 24R and voltage regulating diode 18V whereby a fixed-amplitude direct voltage appears across capacitor 24C. This voltage is applied across the serially interconnected resistive elements of the initial speed controlling dual potentiometer 14PA—14PB and across the serially interconnected resistive elements of the running speed controlling dual potentiometer 16PA—16PB. It should be recognized that while the elements of each of the shown variable elements 14P, 15P and 16P are represented to be ganged in the conventional manner, the mechanical interconnection is such that when the wiper of the left-hand or "A" element is moved clockwise, the wiper of the right-hand or "B" element moves counterclockwise in the representation of FIG. 9.

Assuming that relay 16CR (FIG. 3) is not yet operated, so that contacts 16CRa and 16CRb (FIG. 9) are closed and contacts 16CRc and 16CRd are open, the input circuit for the left-hand section of tube 19V may be traced from the grid of that section, resistor 28R, contact 16CRb, the wiper and left-hand portion of the resistive element of potentiometer 14PB, the entire resistive element of potentiometer 14PA, biasing resistor 30R, and to the cathode of the left-hand section of tube 19V.

If potentiometer 14PB is set to its minimum value (whence potentiometer 14PA will be at its maximum setting), the left-hand section of tube 19V will conduct a minimum amount of current, the voltage drop across load resistor 26R will be minimum, and the voltage at the anode of the left-hand section of tube 19V will be at a maximum value. Obviously, the potential at the anode of the left-hand section of tube 19V will decrease as the setting of potentiometer 14PB is increased (clockwise).

The grid-to-cathode of the right-hand section of tube 19V is determined by the setting of potentiometer 14PA, by the amplitude of a reference voltage determined in part by the setting of potentiometer 20P, and by the amplitude of a current feedback voltage determined in part by the setting of potentiometer 19P.

Considering each of these control-voltage sources in detail, the voltage across the motor armature CMA (plus the voltage drop across the surge suppressing resistor RA) is applied through contacts 15CRc, 14CRb, 14CRd and 21CRa across a filter network including capacitors 33C to 35C and resistors 33R and 34R. The filter output voltage, across capacitor 35C, is applied across the resistive element of potentiometer 20P, producing a voltage across capacitor 36C which varies as a function of the voltage across armature CMA and as a function of the setting of potentiometer 20P, with the left-hand electrode of capacitor 36C being positive relative to the right-hand electrode thereof. The charge on capacitor 36C is therefore a measure of armature speed.

To compensate for change in loading on the motor, a second compensator is provided which modifies the signal on capacitor 36C to compensate for the IR drop in the motor armature. This signal is proportional to current and is derived from primary winding 22TP1 in the anode circuit of thyratron 14V, and another primary winding 22TP2 of the same transformer in the anode circuit of thyratron 15V. The resultant voltage across the secondary winding 22TS which is a function of armature current is rectified by the dry-disc, full-wave rectifier 28RE–31RE and applied across capacitor 31C and across the resistive element of potentiometer 19P through a sensitivity control variable resistor 18P (which is adjusted to prevent hunting). As a result, a voltage is produced across capacitor 32C the amplitude of which is a function of the amplitude of the anode currents in thyratrons 14V and 15V and proportional to the IR drop through the armature CMA. The degree of compensation is a function of the setting of the potentiometer 19P. The rate at which the magnitude of the charge on capacitor 32C changes is a function of the setting of the sensitivity or anti-hunt control 18P.

The input circuit of the right-hand section of tube 19V may be traced from the control grid thereof, resistor 29R, capacitor 32C (considered as a voltage source), capacitor 36C (considered as a voltage source), contact 16CRa, the wiper and left-hand portion of the resistive element of potentiometer 14PA, resistor 30R, to the cathode of that right-hand section of tube 19V. Hence, there are in effect three voltage sources serially interconnected in the input circuit, with the voltage produced by the setting of potentiometer 14PA and the voltage across capacitor 36C both tending to make the grid of the right-hand section of tube 19V positive relative to the cathode, and with the voltage across capacitor 32C being of opposite polarity. The parameters are so selected and the potentiometers are preferably so set that when the left-hand section of tube 19V is conducting to a minimum degree, the right-hand section of tube 19V is conducting near maximum, i.e., near saturation. As a result, the voltage at the anode of the left-hand section of tube 19V is at a maximum positive value, and the voltage at the anode of the right-hand section of tube 19V is at a minimum positive value.

It will be appreciated that since the two sections of tube 19V are cathode coupled, a more positive signal voltage on the control grid of the right-hand section changes to produce a decrease in the positive voltage of its anode, and the cathodes of both sections will become more positive which will cause an increase in the voltage of the anode of the left-hand section. The opposite will occur upon a decrease in grid signal on the right-hand section. Hence, a signal-voltage change will produce a greatly emphasized change in the voltage between the two anodes of tube 19V. This functioning is similar to that of tube 12V (FIG. 6) described hereinbefore.

The voltages at the two anodes of tube 19V are employed to control the conductivity of tube 20V, there being, in addition, a selectable fixed bias applied to this tube. The bias voltage is derived by the full-wave rectification, by dry disc rectifiers 24RE to 27RE, of the effectively fixed-amplitude alternating voltage appearing across transformer secondary winding 25TS, and by the filtering of that rectified voltage by means including capacitors 28C to 30C and resistors 31R and 32R. A selected portion of this direct voltage appears between the movable element and the right-hand end of the resistive portion of potentiometer 17P, with the former being positive relative to the latter. Hence, the voltage at the cathodes of the two sections of tube 20V is determined by the setting of potentiometer 17P and by the potential at the anode of the left-hand section of tube 19V, while the potential at the grids of tube 20V is determined by the potential at the anode of the right-hand section of 19V. The conductivity of tube 20V is, therefore, controlled as a function of the several control voltages applied, in effect, through tube 19V to tube 20V.

Tube 20V acts, in effect, as a variable resistor cooperating with capacitor 27C to control the application to the primary transformer winding 23TP of an alternating voltage shifted in phase, to a varying and controlled degree, from the alternating voltage appearing across secondary transformer windings 26TS and 21TS. This phase-shifted signal is applied via secondary windings 23TS1 and 23TS2 to vary the firing angle of the thyratrons 14V and 15V, thereby to control the current through the armature CMA and thereby to control the speed of rotation of the carriage motor. The operation of these phase shifting and firing-angle controlling circuits is similar to those described in detail hereinbefore in the discussion of FIGS. 6 and 7 of the drawings.

As noted, it is intended that potentiometers 14PA—14PB control only the initial speed of rotation of the carriage motor and only the original speed of movement of the carriage. When relay 16CR (FIG. 3) is operated as before described, its contacts 16CRa (FIG. 9) and 16CRb are opened to relieve potentiometer 14P of control, and its contacts 16CRc and 16CRd are closed. As a result, the input circuit for the left-hand section of tube 19V now includes potentiometer 16PB, capacitor 26C, and variable resistor 15PB. The setting of potentiometer 16PB will determine the run speed of the carriage motor, but the rate of acceleration (or deceleration) of the motor between the initial speed and the run speed will be determined by the setting of variable resistor 15PB, in a manner similar to that previously described with reference to variable resistors 8P and 11P (FIG. 6).

Similarly, the voltage applied to the input circuit of the right-hand section of tube 19V, during running conditions, is determined by the setting of potentiometer 16PA, and the rate of change between initial and running conditions is established by the setting of variable resistor 15PA. Thus, the initial speed of the carriage motor is set by potentiometers 14PA—14PB, the run speed is set by potentiometers 16PA—16PB, the rate of acceleration or deceleration intermediate those initial and run speeds is established by variable resistors 15PA—15PB, the self generator voltage across the armature is a measure of speed and is maintained constant by the voltage across capacitor 36C as modified by the voltage across capacitor 32C which compensates for the IR and other energy losses, whereby the carriage motor will operate at constant speed irrespective of load.

It will be noted that positioners may be employed in lieu of carriage movement in the manner known in the art, selector switch 15SW (FIG. 3) and selector switch 122 (FIG. 4) both being set to appropriate positions.

*Wire feed control*

Referring again to FIG. 1, it will be recalled that fusible wire 62 may be fed through guide 64 to the work area under the control of the wire feed mechanism 60. The wire feed mechanism 60, is, in general, conventional and suitable types of such mechanisms are available on the commercial market.

The mechanism 60 is motor driven and the speed of feed or retraction of the wire 62 is a function of the speed of its driving motor. The wire-feed motor may be manually controlled, at times, and means are also provided for automatically controlling the speed of that motor and the feeding of the wire in a preselected manner and coordinated with the movemnet of the carriage 42 and with the progress of the welding operation.

Figure 10:
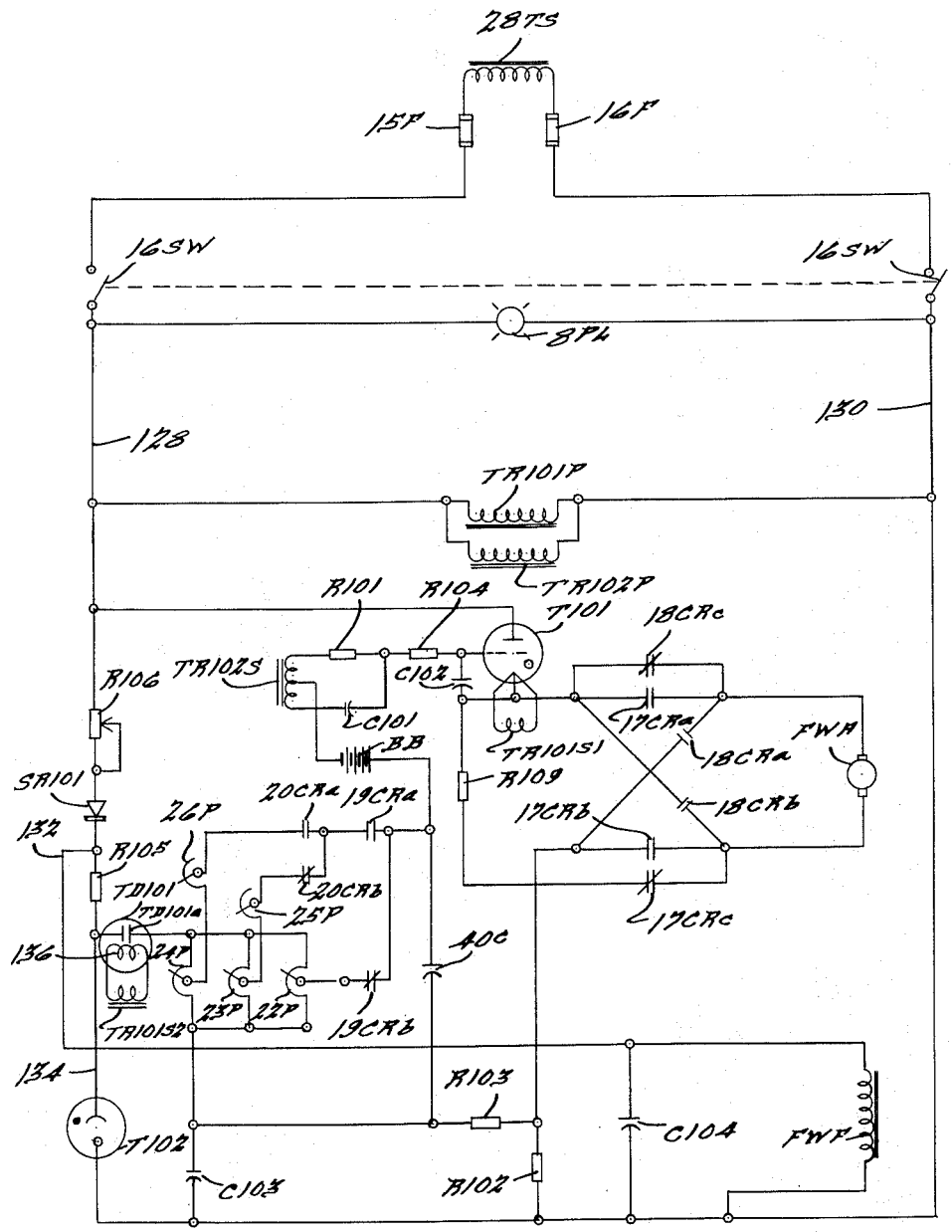
FIG. 10 is a schematic representation of the apparatus for controlling the feed of the filler wire in the welding operation as performed by the apparatus of FIG. 1.

The manual control of the wire-feed motor is exercised through the wire-feed jog switch 110 (FIG. 3) and through relays operated thereby which control the wire-feed motor controlling equipment represented in FIG. 10 of the drawings.

During the period between the time that the control-on switch 1PB (FIG. 2) is closed to operate relay ACR and the time that time-delay unit TDB (FIG. 3) is operated at the initiation of the automatic phase of operation (as will be described), the voltage on conductor 102 may be applied through contact ACRa (FIG. 2), conductor 106, and contacts 2CRDa (FIG. 3) and 2CRBa to the swinger of the wire jog control switch 110. If the swinger of switch 110 is moved into engagement with its upper contact, relay 17CR is operated to cause the wire to be fed to the work area, and if the swinger of switch 110 is moved into engagement with its lower contact, relay 18CR is operated to cause the wire to be retracted from the work area, both in a manner hereinafter to be described.

The motor which is a constituent element of the equipment 60 (FIG. 1) is assumed to be a fractional horsepower, shunt-wound, direct-current type, the armature FWA and the field winding FWF of which are represented in FIG. 10 of the drawings.

When power is connected to the lines L1 to L3 (FIG. 5), the voltage phase appearing between conductors L2 and L3 is applied across the primary winding 28TP, and hence a single-phase alternating voltage is developed across secondary winding 28TS (FIG. 10). When the wire-feed-motor control enabling switch 16SW is closed, the voltage across transformer winding 28TS is applied through fuses 15F and 16F so that it appears between conductors 128 and 130, whereby the indicator lamp 8PL and the primary transformer windings TR101P and TR102P are energized.

The voltage appearing between conductors 128 and 130 is also applied across a series circuit including variable resistor R106, rectifier SR101 (exemplarily shown to be of the dry-disc type), conductor 132 and capacitor C104. As a result, the alternating supply voltage is rectified and a direct voltage is developed between conductors 132 and 130 and across capacitor C104, producing a flow of energizing direct current through the field winding FWF. The rectified direct voltage appearing between conductors 132 and 130 is also applied across the serially interconnected ballast resistor R105 and voltage regulating tube T102, producing a fixed-amplitude direct voltage between conductors 134 and 130.

The feed-motor controlling apparatus includes a thyratron T101, the filament of which is energized by transformer secondary winding TR101S1. To prevent damage to this tube, means are provided for preventing the application of a grid voltage thereto until adequate time has been provided for the filament to be heated. This means comprises a time delay unit TD101 exemplarily of the type which includes a pair of normally open contacts TD101a which are closed when a bimetallic element becomes sufficiently heated by a heater winding 136 connected across the secondary transformer winding TR101S2. When contacts TD101a are closed, the direct voltage appearing between conductors 134 and 130 is applied across a network comprising the resistive windings of potentiometers 22P, 23P and 24P, connected in parallel with one another, and resistors R103 and R102, these resistors being shunted by filter capacitor C103. Resistor R102 is very small relative to resistor R103 and serves a feedback function as will be described hereinafter.

The operation of the circuit of FIG. 10 is controlled, in part, by relays 17CR (FIG. 3), 18CR, 19CR (FIG. 4) and 20CR. Prior to the commencement of the welding operation, each of these relays is released. Hence, the voltage appearing at the wiper of potentiometer 23P (FIG. 10) and the voltage appearing at the wiper of potentiometer 24P will not produce a useful result at this time, since contact 19CRa is now open. However, the voltage appearing between the wiper and the lower end of the winding of potentiometer 22P appears across capacitor 40C since contact 19CRb is closed. This voltage across capacitor 40C is applied, as one of a plurality of effective voltage sources, between the control grid and cathode of thyratron T101, the anode of which is connected to conductor 128. However, prior to the initiation of welding, the grid circuit for thyratron T101 is not complete and no useful result is produced, at this time. Contacts 17CRa, 17CRb, 18CRa and 18CRb are open so that the armature FWA is not energized.

This situation continues until either relay 17CR or 18CR (FIG. 3) is operated. As before noted, either of these relays may be manually actuated under the control of switch 110 at any time that the machine is not in its automatic phase of operation. However, when automatic control is established and when relay CR8 (FIG. 7) releases upon the striking of the arc, as previously described, the voltage on conductor 102 (FIG. 2) is applied through the closed contacts CR1a and CR8a to the start lead SLab to initiate the timing operation of the wire start delay timer TDB (FIG. 3). At the expiration of the selected time interval, timer TDB opens its contact 2CRBa to prevent the exercise of manual control over the feeding or retracting of the wire by switch 110, and closes its contact 2CRBb to complete a circuit including contact 2CRDa to energize the wire feed control relay 17CR. Hence, relay 17CR operates and relay 18CR either releases or remains released depending on its prior condition.

Referring again to FIG. 10, at the instant of operation of relay 17CR, contact 17CRc is opened to remove the dynamic braking resistor R109 from its shunting relation to armature FWA. The closure of contacts 17CRa and 17CRb completes both the anode-cathode output circuit and the grid-cathode input circuit of thyratron T101.

Considering first the output circuit of thyratron T101, upon the operation of relay 17CR, a circuit is completed from conductor 128, anode and cathode of thyratron T101, contact 17CRa, armature FWA, contact 17CRb, resistor R102, to conductor 130.

Considering the input circuit of thyratron T101, upon the operation of relay 17CR, the cathode of thyratron T101 is connected through contact 17CRa, armature FWA, contact 17CRb resistor R103, capacitor 40C, negative bias battery BB, the center tap of secondary transformer winding TR102S, through the two halves of that winding and resistor R101 and capacitor C101, respectively, and through resistor R104 to the control grid of thyratron T101. In this input circuit, resistor R103 may be considered as a voltage source which varies as a function of armature current. This is because the voltage appearing across capacitor C103 is effectively constant. With no armature current flowing, the voltages across R103 and R102 divide in proportion to their resistor values and since the value of R102 is very small relative to that of R103, substantially the entire drop is across R103. When armature current flows, the drop across R102 increases and, since the total drop across R103 and R102 is a constant, the drop across R103 will decrease, and conversely. The input or bias circuit further includes capacitor 40C which may be considered as a voltage source since the voltage thereacross is controlled, at this instant in the system's operation, by the setting of potentiometer 22P; battery BB is a negative bias voltage source; and the secondary winding TR102S, resistor R101 and capacitor C101 constitute a source of phase-shifted alternating grid-bias voltage. Additionally, the counter electromotive force developed by the armature FWA also serves as an effective voltage source in the input circuit of thyratron T101, and this together with R103 constitutes a primary factor in controlling the grid-to-cathode voltage of thyratron T101 so that the speed of the rotation of the motor remains constant at any preselected value and the charge on capacitor 40C preselects the speed and/or varies the speed at any preselected controlled rate.

It will be recognized that the speed of rotation of the wire-feed motor will vary directly as a function of the voltage across capacitor 40C and it is by controlling the amplitude of that voltage that the rate of wire feed is preselected. Thus, as aforesaid, at the instant of operation of relay 17CR, the voltage across capacitor 40C is under the control of potentiometer 22P and hence the initial speed of the wire feed motor is established by the setting of that potentiometer. However, if the control switch 13SW (FIG. 4) is open, the operation of relay 17CR (FIG. 3) completes an energizing circuit for relay 19CR (FIG. 4). When relay 19CR operates, it opens its contacts 19CRb (FIG. 10) to terminate the control of the wire-feed motor speed by potentiometer 22P.

Relay 19CR (FIG. 4) in operating, also closes its contact 19CRa (FIG. 10) so that the running-speed voltage across capacitor 40C is controlled by the setting of potentiometer 23P, and the rate of change of the voltage thereacross is established by the setting of variable resistor 25P.

It will be noted that control of the motor speed by potentiometer 22P may be totally eliminated by closing switch 13SW (FIG. 4) in which case relay 19CR will be operated prior to the time that relay 17CR (FIG. 3) operates. It will be further noted that if it is desired to cause a wire-feed "surge" during the course of the welding operation, such as when the weld crosses a seam or is being used on repair work, potentiometer 22P may be set to a position at which the voltage produced thereby across the capacitor 40C is higher than that produced by the instant setting of potentiometer 23P, so that the wire-feed surge may be produced, under manual control, by momentarily opening switch 13SW (FIG. 4) momentarily to release relay 19CR so as momentarily to throw the system back into the initial condition previously described.

The wire feed mechanism shown in FIG. 10 continues to feed wire to the work at a rate selected by the setting of potentiometer 23P, until, in one mode of operation of the system, the carriage 42 (FIG. 1) actuates the limit switch LS4 which normally occurs at a point just prior to the end of the line of welding. Assuming the carriage-positioner selector switch 122 (FIG. 4) to be in its No. 1 position, the voltage on conductor 102 is applied through closed contacts ACRa (FIG. 2) and BCRb, conductor 120, limit switch LS4, No. 1 contact of switch 122, and to the start lead SLc of the current-decay delay equipment TDC. Unit TDC will thereby be energized and will seal in through contacts 1CRCb, connected in bypass of limit switch LS4 and switch 122.

It will be noted that the current-decay delay unit TDC may alternatively be energized by manually depressing the current-decay switch 4PB or by the operation of any other one of the limit switches LSP, assuming the carriage positioner selector switch is in an appropriate position. Limit switches LSP are assumed to be associated with individual positioner mechanisms, in the known fashion, and to be operative at such time as the positioner has reached its condition correlative to the time at which limit switch LS4 is operated by carriage 42 (FIG. 1).

At the termination of the delay interval of unit TDC (FIG. 4), contact 2CRCb (FIG. 4) is closed to operate relay 20CR (assuming swich 14SW to be closed). When relay 20CR operates, its contact 20CRb (FIG. 10) is opened to relieve potentiometer 23P of control of the wire-feed motor speed, and contact 20CRa is closed to place potentiometer 24P and variable resistor 26P in control of the voltage across capacitor 40C, and hence of the speed of the wire-feed motor.

Thus, in the normal operation of the device, the initial speed of the wire-feed motor is controlled primarily by potentiometer 22P, the running speed is controlled primarily by potentiometer 23P, and the final speed of the wire-feed motor is controlled primarily by the setting of potentiometer 24P, these potentiometers being sequentially enabled to perform their functions, as described. It will be observed that since the settings of potentiometers 22P, 23P and 24P are normally different from one another, the charge on capacitor 40C must correspondingly change. Hence, at each switch of control, capacitor 40C must charge or discharge to a different voltage level through a resistive path, inherently creating a time rate of change of voltage. Thus, when relay 19CR operates, capacitor 40C must charge or discharge over a path including variable resistor 25P, and when relay 20CR operates, capacitor 40C must charge or discharge over a path including variable resistor 26P. By appropriate selection of the values of variable resistors 25P and 26P, the rate of change of speed of the wire-feed motor may be chosen in accordance with the requirements of any given situation.

As before noted, however, the initial-speed control potentiometer 22P may be effectively disabled by opening switch 13SW (FIG. 4) so that the wire will start feeding at the run rate. Similarly, the final-speed control potentiometer 24P (FIG. 10) may be disabled by opening switch 14SW (FIG. 4) so that the rate of wire feed will remain constant at the running rate, until that feed is terminated.

Upon the operation of time-delay unit TDC (FIG. 4), its contact 2CRCa is closed to apply the voltage on conductor 120 to the start lead SLde to energize both the wire-stop-delay unit TDD and the tailing-time-delay unit TDE. Contact 1CREb (FIG. 2) immediately operates (as was noted in the discussion of FIG. 11) to seal both units TDD and TDE energized.

When, after the selected delay interval, the wire stop delay unit TDD (FIG. 4) operates to open its contacts 2CRDa (FIG. 3), relay 17CR is released, resulting in the immediate termination of the energization of the wire-feed motor and the dynamic braking of that motor by the connection of the resistor R109 (FIG. 10) in shunt of that motor's armature FWA.

At the end of the tailing time-delay interval, unit TDE (FIG. 4) opens its contact 2CREa (FIG. 2) to de-energize relay BCR. Relay BCR, in releasing, opens its contact BCRb to remove the voltage from conductor 120 thereby releasing all of the previously described elements which operated therefrom. Relay BCR, in releasing, also opens its contact BCRa to interrupt its own sealing path so that even though the tailing time unit TDE (FIG. 4) is de-energized to reclose its normally closed contact 2CREa (FIG. 2), relay BCR will not again be operated until the start weld button 3PB is again depressed. The wire feed mechanism is thereby restored to normal, in condition to be manually controlled by switch 110 (FIG. 3) and in condition to again enter another cycle of automatic operation.

While the principles of the invention have been exemplarily embodied in an arc welder, it is to be recognized that at least certain of those principles are applicable to other types of welding and to other fields of electrical current control. While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a welding apparatus, power transformer means having three primary windings and three secondary windings, sensing transformer means having three primary windings and three secondary windings, a source of three-phase alternating current, each of said power transformer primary windings being connected in series with an individual one of said sensing transformer primary windings across an individual one of the phases of said three-phase source, means for developing a direct voltage having an amplitude which varies as a function of the current through said secondary windings of said sensing transformer means, control transformer means having three primary windings and three secondary windings, each of the primary windings of said control transformer means being serially interconnected with an individual one of said secondary windings of said power transformer means, load means drawing current from all of said secondary windings of said power transformer means through said primary windings of said control transformer means, and means responsive to the amplitude of said direct voltage for controlling the average current amplitude through said secondary windings of said control transformer means.

2. In a welding apparatus, power transformer means having core means, three primary windings and three secondary windings, sensing transformer means having three primary windings and three secondary windings, a source of three-phase alternating current, each of said power transformer primary windings being connected in series with an individual one of said sensing transformer primary windings across an individual one of the phases of said three-phase source, means for developing a direct voltage having an amplitude which varies as a function of the current through said secondary windings of said sensing transformer means, control transformer means having core means and three primary windings and three secondary windings, each of the primary windings of said control transformer means being serially interconnected with an individual one of said secondary windings of said power transformer means, load means drawing current from all of said secondary windings of said power transformer means through said primary windings of said control transformer means, and means responsive to the amplitude of said direct voltage for controlling the average current amplitude through said secondary windings of said control transformer means, said core means of said power transformer means approaching saturation at lower current amplitudes than said core means of said control transformer means.

3. In an arc welder including an electrode for welding a workpiece, the combination of a voltage sensitive device responsive to the voltage between the electrode and the workpiece, a plurality of transformers each having a primary winding and a secondary winding, means connecting said primary windings of a first three of said transformers in delta, means connecting said primary windings of a second three of said transformers individually in series with said secondary windings of said first three transformers and connecting said series connected windings in delta, a plurality of pairs of reversedly connected electric valves, means individually connecting a pair of said valves across each said secondary winding of said second three transformers, a third three of said transformers, means connecting said primary windings of said third three transformers individually in series with said primary windings of said first three transformers, a first impedance, a rectifier array connected between said secondary windings of said third three transformers and said first impedance whereby the potential across said impedance is a function of the current flow through said first three transformers, a second impedance, a source of unidirectional potential, means connecting said second impedance to said unidirectional potential and including means for changing the potential appearing across said second impedance, means responsive to said voltage sensitive device to actuate said potential changing means, means connecting said impedances in series, and a phase changing network having an output connected to control the firing of said valves and having an input connected across said series connected impedances whereby the phase shift of said output is controlled as a function of the potential across said impedances.

4. In an arc welding apparatus for welding a workpiece with energy derived from a polyphase source, a transformer array having its primary windings connected in delta across said polyphase source and having its secondary windings connected in delta, a rectifier having its input connected to said last-named delta and its output connected across a pair of terminals of said welding apparatus, a current sensing network having sensing components equal in number to the phases of said source and connected in said first-named delta such that there is a component individual to each said source phase, a current controlling network having current controlling components equal in number to the phases of said source and connected in said second-named delta such that there is a current component individual to each said source phase, and means interconnecting said current sensing network and said current controlling network whereby said sensing network acts to regulate said controlling network to maintain the output current to said welding apparatus constant irrespective of the output voltage, each said sensing component and each said current regulating component being a transformer, the primary windings of said sensing component transformer being connected individually in series with said primary windings of said transformer array, the primary windings of said current regulating component transformers being connected individually in series with said secondary windings of said transformer array, said interconnecting means including a rectifying device, a first and a second impedance device connected in series, and a plurality of pairs of back-to-back connected electric valves, means connecting the secondary windings of said sensing network transformers through said rectifying device to said first impedance device, means individually connecting said pairs of valves across said secondary windings of said current regulating network transformers, means connecting said series connected impedance devices to said pairs of valves whereby the current conducted by said valves is a function of the magnitude of the potential established across said impedance devices, said actuated means acting to change the potential established by said second impedance device.

References Cited in the file of this patent

UNITED STATES PATENTS

| | | |
|---|---|---|
| 1,305,039 | Wagner | May 27, 1919 |
| 1,481,071 | Sindelar et al. | June 15, 1924 |
| 1,653,376 | Shelly | Dec. 20, 1927 |
| 1,838,899 | Arnold | Dec. 29, 1931 |
| 1,913,909 | Wolfe | June 13, 1933 |
| 1,959,513 | Weyandt | May 22, 1934 |
| 2,025,785 | Southgate | Dec. 31, 1935 |
| 2,175,026 | Jones | Oct. 3, 1939 |
| 2,200,632 | Mills | May 14, 1940 |
| 2,444,472 | Schooley | July 6, 1948 |
| 2,510,207 | Behnke et al. | June 6, 1950 |
| 2,529,111 | Steinberger | Nov. 7, 1950 |
| 2,597,689 | Welch | May 20, 1952 |
| 2,629,071 | Anderson | Feb. 17, 1953 |
| 2,632,862 | Stolz | Mar. 24, 1953 |
| 2,644,109 | Mulder | June 30, 1953 |
| 2,657,335 | Herskind | Oct. 27, 1953 |
| 2,714,188 | Scherer | July 26, 1955 |
| 2,786,160 | Bichsel | Mar. 19, 1957 |